US012452924B2

(12) United States Patent
Jamadagni et al.

(10) Patent No.: US 12,452,924 B2
(45) Date of Patent: Oct. 21, 2025

(54) SYSTEM AND METHOD OF ENABLING A SELF ORGANIZING NETWORK IN OPEN RAN

(71) Applicant: JIO PLATFORMS LIMITED, Ahmedabad (IN)

(72) Inventors: Satish Nanjunda Swamy Jamadagni, Bangalore (IN); Mahesh Nayaka Mysore Annaiah, Bangalore (IN); Mathew Oommen, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 95 days.

(21) Appl. No.: 18/246,303

(22) PCT Filed: Jul. 29, 2022

(86) PCT No.: PCT/IB2022/057059
§ 371 (c)(1),
(2) Date: Mar. 22, 2023

(87) PCT Pub. No.: WO2023/007452
PCT Pub. Date: Feb. 2, 2023

(65) Prior Publication Data
US 2024/0015790 A1   Jan. 11, 2024

(30) Foreign Application Priority Data
Jul. 29, 2021 (IN) .............................. 202121034199

(51) Int. Cl.
*H04W 74/0816* (2024.01)
*H04W 74/00* (2009.01)

(52) U.S. Cl.
CPC ..... *H04W 74/0816* (2013.01); *H04W 74/002* (2013.01)

(58) Field of Classification Search
CPC ............... H04W 24/02; H04W 74/002; H04W 74/0816; H04W 88/12
See application file for complete search history.

(56) References Cited

U.S. PATENT DOCUMENTS 11,197,200 B2 * 12/2021 Yang ..................... H04L 47/283
2021/0051490 A1 * 2/2021 Yanover ................ H04W 24/02
(Continued)

OTHER PUBLICATIONS

O-RAN Working Group 2 Non-RT RIC: Functional Architecture, O-RAN.WG2.Non-RT-RIC-ARCH-TR-v01.01, Technical Report (Jun. 30, 2021) Jun. 30, 2021.
(Continued)

*Primary Examiner* — Kashif Siddiqui
(74) *Attorney, Agent, or Firm* — FINNEGAN, HENDERSON, FARABOW, GARRETT & DUNNER LLP

(57) ABSTRACT

The present disclosure relates wireless communication, more particularly to systems and methods for enabling self-organizing networks in an Open Radio Access Network (O-RAN). A system via Near-RT RIC assigns at least one of one or more time-sensitive SON functional elements and one or more time-sensitive RRM functional elements in at least one of the Near-RT RIC and the EMS entity associated with the SMO module. The system via a Near-RT RIC may assign at least one of one or more time-sensitive SON functional elements and one or more time-sensitive RRM functional elements in at least one of the Near-RT RIC and the EMS entity associated with the SMO module. The Near-RT RIC may access via at least one of the xAPPs associated with the O-RAN and the EMN entity or the NMS entity, one or more Performance Monitoring (PM) counters, by requesting respective E2 Nodes via the E2 interface or via the O1 interface, respectively.

28 Claims, 14 Drawing Sheets

(56) References Cited

U.S. PATENT DOCUMENTS

| | | | |
|---|---|---|---|
| 2021/0204148 A1* | 7/2021 | Chou | H04W 24/02 |
| 2021/0306899 A1* | 9/2021 | Mishra | H04W 28/0975 |
| 2022/0159525 A1* | 5/2022 | Chou | H04W 36/0058 |
| 2022/0338164 A1* | 10/2022 | Simon | H04W 4/06 |

OTHER PUBLICATIONS

International Search Report from International Appl. No. PCT/IB2022/057059, mailed Oct. 13, 2022.

* cited by examiner

SYSTEM AND METHOD OF ENABLING A SELF ORGANIZING NETWORK IN OPEN RAN

FIELD OF INVENTION

The embodiments of the present disclosure generally relate to wireless communication. More particularly, the present disclosure relates to systems and methods for enabling self-organizing networks in an Open Radio Access Network (O-RAN).

BACKGROUND OF THE INVENTION

The following description of related art may intended to provide background information pertaining to the field of the disclosure. This section may include certain aspects of the art that may be related to various features of the present disclosure. However, it should be appreciated that this section be used only to enhance the understanding of the reader with respect to the present disclosure, and not as admissions of prior art.

Generally, a modern mobile communications network include a combination of different cell types and different access technologies. As cellular networks evolve from a Fourth Generation (4G), a Fifth Generation (5G) and then to a Sixth Generation (6G) along with other radio access technologies such as a Wireless Fidelity(WiFi), the mobile subscriptions are also exponentially increasing, the deployment of very high-density Heterogeneous Networks (HetNets) to fulfil the demands of the subscribers has become increasing important. The HetNets are generally built by Multi-Portfolio and Multi-Vendor based solutions. The key challenges that the operator face during the greenfield or brownfield deployments of the HetNets may the demand for high quality installations that covers: continuous monitoring of performance and health of the deployed networks; dynamically adapting to changing environments; proactive adjustments and optimization and the like. These challenges demand very high manual work, lot of delay due to regular/frequent field visits and hence leading to very huge Operational Expenses. To overcome these deficiencies and to drastically reduce the OPEX, Self-Organising Network (SON) may the solution. The SON may a Self-Organizing Network or Self-Optimizing Network, which may an automation technology that enables the network to set itself up and self-manage resources and configuration to achieve optimal performance. SON performs its role under the following categories:

Self-Configuration: Aids in seamlessly integrating into the network through automatic configuration of key parameters. It may most valuable during initial network deployments. It includes the following capabilities such as Plug-and-Play functionalities [PnP], Automatic Neighbor Relation function (ANR), Physical layer cell identity [PCI] selection and conflict resolution functions and the like.

Self-Optimization: Aids in enhanced network performance through near real time optimization of radio and network configurations. It may valuable throughout the lifetime of the network. It includes the following capabilities such as Mobility Load Balancing (MLB), Mobility Robustness Optimization (MRO), RACH Optimization, Energy saving (ES), Radio Link Failure Reporting, Coverage and Capacity Optimization (CCO), Downlink (DL) power control, Remote Electrical Tilt (RET), Forward Handover, Frequent Handover Mitigation (FHM), Interference Mitigation (Inter-Cell, Intra-Cell, Intra-RAT, Inter-RAT).

Self-Healing: It allows adjacent cells to maintain network quality in case a cell/sector fails, providing resiliency (reliability) in the face of unforeseen outage conditions. It may valuable throughout the lifetime of the network. It includes the following capabilities:Cell Outage Detection. [Dead/Sick/Sleeping cell/sector/beam], Cell Outage Recovery, Cell Outage Compensation, Cell Outage Compensation Recovery and the like minimization of Drive Test [MDT] functionality has been designed to operate independently from SON, although its functionalities are reused wherever possible. The above SON functions are handled by SON algorithms either individually or in groups. SON algorithms perform the functionalities like Monitoring the network(s) by collecting management data including MDAS data, Analys may of the management data to determine if there are issues in the network(s) that need to be resolved, decision on the SON actions to resolve the issues, execution the SON actions and Evaluation of whether the issues have been solved by analysing the management data.

Based on the location of the SON algorithm, SON may categorized into four different solutions that are possible for implementing various SON use cases, the solution may selected depending on the needs of the SON use cases.

Centralized SON [C-SON]: It means that the SON algorithm executes in the management system.

Cross Domain-Centralized SON [CD C-SON]: Here, the SON algorithms executes in the Cross-Domain layer.

Domain-Centralized SON [D C-SON]: Here, the SON algorithm executes in the Domain layer.

Distributed SON [D-SON]: Here, the SON algorithms are in the NFs.

Hybrid SON [H-SON]: Here, the SON algorithms are executed at two or more levels like NF layer, Domain layer or Cross Domain layer.

In 3GPP specifications for the SON (Self Organizing Networks) functions, a description of the functions may provided but the specification does not say how the same must be implemented. This leads to multi-vendor integration issues and has discouraged operators from implementing the SON in their networks. The O-RAN alliance may a consortium that aims to alleviate these multivendor interoperability issues, but the SON functionalities have not been addressed in the O-RAN architecture. Moreover, since the SON algorithms are left to implementation, different vendors may choose different approaches for their SON solutions. Some vendors may come up with Centralised SON (C-SON) approach, some with Distributed SON (D-SON) approach and others with Heterogenous SON approach-based solutions. The operators are inevitable to use multivendor solutions while deploying HetNets. FIG. 2A illustrates a typical 5G HetNet deployment scenario wherein management entities like NMS from a different vendor, set of EMS'es from a different set of vendors, RAN nodes like gNB-Control units (CU) from a different set of vendors and gNB-distributed units (DU) from a different set of vendors. The set of few issues that the operator faces in the above illustrated deployed HetNet are as follows: D-SON of gNB-CU-1 (214-1) and gNB-CU-2 (214-2) may not coordinate well as both are from different vendors, though they communicate each other via open Xn interface.D-SON of gNB-CU-2 and the Hybrid SON of gNB-CU-N (214-N) [D-SON+D C-SON] may not coordinate well as both are from different vendors, though they communicate each other via open Xn interface.C-SON can be realized as either collocated with management entities such as Element Management System (EMS) or network management system (NMS) or as a standalone entity. Integrating the C-SON as a standalone entity with RAN nodes may be a difficult task, as the interface may left to implementation. The centrally distributed (CD) C-SON in the NMS may impact the performance of the D C-SON and D-SON functionalities, operating in the Multivendor environment. Integrating a $3^{rd}$-party SON solutions partially in the HetNet, leads to degradation of the overall KPIs. L3-RRM coordination across the neighborg NB-CUs may be lacking irrespective of the same or multivendor scenarios, which may have impact on the overall KPI performance. L3-RRM and L2-RRM (216-1) coordination across the Multi-vendor gNB-CU and gNB-DU may have impact on the dynamic resource sharing and allocation. SON and RRM, being a proprietary implementation, have significant impact on the overall performance, though multivendor coordinates each other across the Xn interface, because each algorithm behaves differently and have their own pros and cons [limitations]. Even if the vendors are ready to integrate with the third-party solutions [SON and/or RRM], they cannot deterministically quantify/confirm the output performance.

In certain cases, an alliance between SON solutions and the interacting RAN nodes may converted to an open interface to re-shape the RAN to be more intelligent, open, virtualised and fully interoperable mobile networks. The new O-RAN standards may enable a more competitive and vibrant RAN supplier ecosystem with faster innovation to improve user experience. O-RAN based mobile networks may at the same time improve the efficiency of RAN deployments as well as operations by the mobile operators. The key objectives of O-RAN Alliance are as follows:

Leading the industry towards open, interoperable interfaces, RAN virtualization, and big data and AI enabled 4 RAN intelligence.

Maximizing the use of common-off-the-shelf hardware and merchant silicon and minimizing proprietary hardware.

Specifying Access points (Aps) and interfaces, driving standards to adopt them as appropriate, and exploring open source where appropriate.

The O-RAN Architecture identifies the key functions and interfaces adopted in O-RAN.

In O-RAN architecture, there may be logical blocks which includes Near-Real Time (RT) RAN Intelligent controller (RIC), an Open radio access network Central Unit Control Plane (O-CU-CP), an Open radio access network Central Unit User Plane (O-CU-UP), an Open radio access network Distributed Unit (O-DU), and an Open radio access network Radio Unit O-RU functions. The E2 interface connects O-eNB to Near-RT RIC. Further, an O-Enb may support O-DU and O-RU functions with an Open Fronthaul interface between them. The management side includes Service Management and Orchestration (SMO) Framework containing a Non-RT-RIC function. The O-Cloud (234), on the other hand, may a cloud computing platform comprising a collection of physical infrastructure nodes that meet O-RAN requirements to host the relevant O-RAN functions (such as Near-RT RIC, O-CU-CP, O-CU-UP and O-DU etc.), the supporting software components (such as Operating System, Virtual Machine Monitor, Container Runtime, etc.) and the appropriate management and orchestration functions. As shown in FIG. 2B, the O-RU terminates the Open Fronthaul M-Plane (236) interface towards the O-DU and SMO.

Thus, as can be seen the conventional approaches to have many limitations. As the mobile subscription may exponentially increasing, the data demand may very high for each subscriber. Along with the explosion of the cellular heterogenous network deployment, there may a huge demand for the deployment of the Wi-Fi Access Points [AP], to fulfil the huge data throughput requirements. As a result, the operator may densely deploying the Wi-Fi Access Points which may operate at 2.4 GHz, 5 GHz and even at higher frequencies. Also, the operator may forced to use multivendor solutions to deploy in its network for the scenarios like carrier grade Wi-Fi, enterprise Wi-Fi, Mi-Fi, Home Wi-Fi, and the like., With a massive number of APs deployed, the interference may becoming a crucial issue to deal with. Future, networks must deal with this interference management issue through SON/RRM functionalities for organization and optimization of APs. If the APs are densely deployed without coordination, they may exhibit poor Channel/spectrum reuse. Moreover, significant contention among APs and clients might occur, resulting in low throughput and poor end-user experience.

Therefore, there may a need in the art to provide systems and methods that can overcome the short comings of the existing prior art.

OBJECTS OF THE PRESENT DISCLOSURE

Some of the objects of the present disclosure, which at least one embodiment herein satisfies are as listed herein below.

An object of the present disclosure is to provide system and method for enabling self-organizing networks in an Open Radio Access Network (O-RAN).

An object of the present disclosure is to provide an integration of self organising network (SON) and Radio resource management (RRM) functionalities into the Near-Real time RIC and Non-Real time RIC entities guided by the time sensitive characteristics of these functions.

An object of the present disclosure is to provide a system and method for facilitating specific data collection mechanisms to address the specific SON and RRM functionalities.

An object of the present disclosure is to provide a system and method for ensuring all necessary data for RAN level optimizations are available at a single network entity.

An object of the present disclosure is to provide a system and method for facilitating coverage of the locality of execution of the RRM functionalities as well using the O-RAN architecture and proposes a functional execution split localization of SON and RRM functionality at the Near Real Time (RT)-RAN Intelligent Controller (RIC) and the Non RT-RIC entities of the O-RAN architecture.

An object of the present disclosure is to provide a system and method for facilitating specific mechanisms of data collection to address the said functionalities of SON and RRM on an O-RAN architecture.

SUMMARY

This section is provided to introduce certain objects and aspects of the present invention in a simplified form that are further described below in the detailed description. This summary is not intended to identify the key features or the scope of the claimed subject matter.

In an aspect, the present disclosure provides a system for enabling a Self-Organizing Network (SON) in an open Radio Access Network (o-RAN). The system includes a Service Management and Orchestration (SMO) module comprising a Non-Real-Time Radio access network Intelligent Controller (Non-RT RIC). The Non-RT RIC may assign at least one of one or more non-real-time Self-Organizing Network (SON) functional elements and one or more non-real-time Radio Resource Management (RRM) functional elements in an Element Management System (EMS) entity associated with the SMO module. The EMS entity communicates with one or more E2 nodes associated with a Radio Access Network (RAN), via an O1 interface. The one or more non-real-time SON functional elements are implemented in at least one of, the Non-RT RIC using individual rAPPs associated with the o-RAN, for each functional element, and the EMS entity or a Network Management System (NMS) entity associated with the SMO module. Further, the Non-RT RIC may exchange at least one of non-real-time SON functional information and non-real-time SON control information with the one or more E2 nodes via at least one of the O1 interface, an A1 interface, and an E2 interface. Further, the system includes a Near Real Time Radio access network Intelligent Controller (Near-RT RIC). The Near-RT RIC may assign at least one of one or more time-sensitive SON functional elements and one or more time-sensitive RRM functional elements in at least one of the Near-RT RIC and the EMS entity associated with the SMO module. Further, the Near-RT RIC may execute, for each function, one or more time-sensitive SON functional elements and the one or more time-sensitive RRM functional elements using individual xAPPs associated with the o-RAN. For each function, the one or more time-sensitive SON functional elements are implemented in the Near-RT RIC using individual xAPPs associated with the o-RAN.

In another aspect, the present disclosure provides a method for enabling a Self-Organizing Network (SON) in an open Radio Access Network (o-RAN). The method includes assigning at least one of one or more non-real-time Self-Organizing Network (SON) functional elements and one or more non-real-time Radio Resource Management (RRM) functional elements in an Element Management System (EMS) entity associated with a SMO module. The Non-RT RIC may associated with a Service Management and Orchestration (SMO) module. The EMS entity communicates with one or more E2 nodes associated with a Radio Access Network (RAN), via an O1 interface. The one or more non-real-time SON functional elements are implemented in at least one of, the Non-RT RIC using individual rAPPs associated with the o-RAN, for each functional element, and the EMS entity or a Network Management System (NMS) entity associated with the SMO module. Further, the method includes exchanging at least one of non-real-time SON functional information and non-real-time SON control information with the one or more E2 nodes via at least one of the O1 interface, an A1 interface, and an E2 interface. Furthermore, the method includes assigning at least one of one or more time-sensitive SON functional elements and one or more time-sensitive RRM functional elements in at least one of the Near-RT RIC and the EMS entity associated with the SMO module. Furthermore, the method include executing, for each function, one or more time-sensitive SON functional elements and the one or more time-sensitive RRM functional elements using individual xAPPs associated with the o-RAN. For each function, the one or more time-sensitive SON functional elements are implemented in the Near-RT RIC (124) using individual xAPPs associated with the o-RAN.

BRIEF DESCRIPTION OF DRAWINGS

The accompanying drawings, which are incorporated herein, and constitute a part of this invention, illustrate exemplary embodiments of the disclosed methods and systems in which like reference numerals refer to the same parts throughout the different drawings. Components in the drawings are not necessarily to scale, emphasis instead being placed upon clearly illustrating the principles of the present invention. Some drawings may indicate the components using block diagrams and may not represent the internal circuitry of each component. It may be appreciated by those skilled in the art that invention of such drawings includes the invention of electrical components, electronic components or circuitry commonly used to implement such components.

The foregoing shall be more apparent from the following more detailed description of the invention.

DETAILED DESCRIPTION OF INVENTION

In the following description, for the purposes of explanation, various specific details are set forth in order to provide a thorough understanding of embodiments of the present disclosure. It may be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only, and may not intended to limit the scope, applicability, or configuration of the disclosure. Rather, the ensuing description of the exemplary embodiments may provide those skilled in the art with an enabling description for implementing an exemplary embodiment. It should be understood that various changes may be made in the function and arrangement of elements without departing from the spirit and scope of the invention as set forth.

The present invention provides an efficient and reliable systems and methods for realizing Self optimizing networks (SON) functionality in specific localities of an Open radio access network (O-RAN) architecture and the interworking methods thereof. The SON and related Radio Resource Management (RRM) functional interfaces are specified to ensure that all necessary data for RAN level optimizations are available at a single network entity. The disclosure covers the locality of execution of the RRM functionalities as well using the O-RAN architecture and proposes a functional execution split localization of SON and RRM functionality at the Near Real Time (RT)-RAN Intelligent Controller (RIC) and the Non RT-RIC entities of the O-RAN architecture and provides specific mechanisms of data collection to address the functionalities of SON and RRM on an O-RAN architecture.

Figure 1:
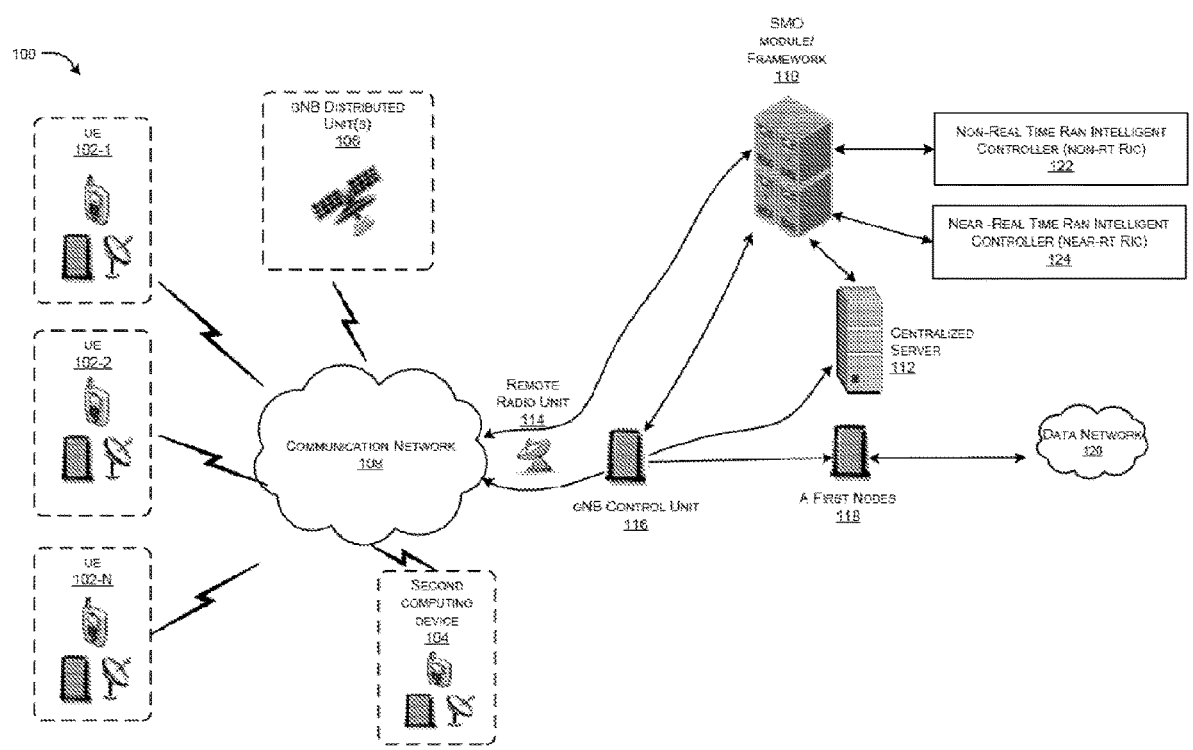
FIG. 1 illustrates an exemplary network architecture in which or with which proposed system of the present disclosure can be implemented, in accordance with an embodiment of the present disclosure.

Referring to FIG. 1 that illustrates an exemplary network architecture for a Self-Organising Network (SON) system (100) (also referred to as network architecture (100)) in which or with which a Service Management and Orchestration (SMO) module/framework (110) or simply referred to as the SMO module (110) of the present disclosure can be implemented, in accordance with an embodiment of the present disclosure. As illustrated, the exemplary network architecture (100) may be equipped with Non-Real Time Radio Access Network (RAN) Intelligent Controller (Non-RT RIC) (122) associated with the SMO module (110), and Near-Real Time Radio Access Network (RAN) Intelligent Controller (Near-RT RIC) (124) communicatively coupled to the SMO module (110), for the SON. The SMO module (110) may be communicatively coupled to a plurality of first computing devices (102-1, 102-2, 102-3 . . . 102-N) (interchangeably referred to as user equipment(102-1, 102-2, 102-3 . . . 102-N) and (individually referred to as the user equipment (UE) (102) and collectively referred to as the UE (102)). Further, the SMO module (110) may be communicatively coupled to a second computing devices (104) associated with an entity. The entity may include, but not limited to, a company, an organization, a network vendor, a manufacturing unit, and the like. The SMO (110) may be further communicatively coupled to a generation Node B(gNB) Distributed Units (DU) or gNB DU(116), and a gNB Control Units (CU) or gNB CU (116). The gNB CU (116) may be communicatively coupled to a plurality of first nodes (118). The gNB CU (116) or the gNB DU (106) may be satellites or any non-terrestrial deployments but not limited to the like.

In an embodiment, the Service Management and Orchestration (SMO) module (110) includes a Non-Real-Time Radio access network Intelligent Controller (Non-RT RIC) (122). The Non-RT RIC (122) may assign at least one of one or more non-real-time Self-Organizing Network (SON) functional elements and one or more non-real-time Radio Resource Management (RRM) functional elements in an Element Management System (EMS) entity (not shown in FIG. 1) associated with the SMO module (110). In an embodiment, the non-real-time SON functional elements include, but not limited to, at least one of an initial Physical layer Cell Identity (PCI) function, an initial Automatic Neighbor Relation (ANR) function, an Energy Saving (ES) function, a cell outage management function, a sick cell and sleeping cell management function, a traffic steering function, a Timing advance (TA) optimization function, and the like.

In an embodiment, the EMS entity may communicate with one or more E2 nodes associated with a Radio Access Network (RAN), via an O1 interface. In an embodiment, the one or more non-real-time SON functional elements are implemented in at least one of, the non-RT RIC (122) using individual rAPPs associated with the o-RAN, for each functional element, and the EMS entity or a Network Management System (NMS) entity (not shown in FIG. 1) associated with the SMO module (110). In an embodiment, the non-RT RIC (122) may exchange at least one of non-real-time SON functional information and non-real-time SON control information with the one or more E2 nodes via at least one of the O1 interface, an A1 interface, and an E2 interface. In an embodiment, the one or more E2 nodes execute, via one or more E2 agents, the non-real-time Self-Organizing Network (SON) functional elements and one or more non-real-time Radio Resource Management (RRM) functional elements from the non-RT RIC (122) received at an E2 termination point by interacting with one or more E2 application functional elements of the one or more E2 nodes. In an embodiment, executing the one or more time-sensitive RRM functional elements in the Near-RT RIC (124) corresponds to localizing in a centralized execution site. In an embodiment, the Near-RT RIC (124) may execute, for each function, one or more time-sensitive SON functional elements and the one or more time-sensitive RRM functional elements using individual xAPPs associated with the o-RAN. In an embodiment, for each function, the one or more time-sensitive SON functional elements are implemented in the Near-RT RIC (124) using individual xAPPs associated with the o-RAN.

In an embodiment, the system (100) may include a Near Real Time Radio access network Intelligent Controller (Near-RT RIC) (124). In an embodiment, the Near-RT RIC (124) may assign at least one of one or more time-sensitive SON functional elements and one or more time-sensitive RRM functional elements in at least one of the Near-RT RIC (124) and the EMS entity (not shown in FIG. 1) associated with the SMO module (110). In an embodiment, the one or more time-sensitive SON functional elements include, but not limited to, at least one of a Mobility Load Balancing (MLB) function, a Mobility Robustness Optimization (MRO) function, a Random-Access Channel (RACH) optimization function, an Energy saving (ES) function, a radio link failure reporting function, a Coverage and Capacity Optimization (CCO) function, a Downlink (DL) power control function, a Remote Electrical Tilt (RET) function, a Forward Handover (FHO) function, a Frequent Handover Mitigation (FHM) function, an Interference Mitigation (Inter-Cell, Intra-Cell, Intra-RAT, Inter-RAT) function, an Inter-Cell Interference Control (ICIC) function, an initial Automatic Neighbor Relation (ANR) function, a Physical layer Cell Identity (PCI) function, and the like. In an embodiment, the one or more time-sensitive RRM functional elements include, but not limited to, a Call/Connection Admission Control (CAC) function, a Radio Bearer Control (RBC) function, a Connection Mobility Control (CMC) function, a Measurement Control (MC) function, an Inter-Cell Interference Control (ICIC) function, a Co-ordinated Multi-Point (CoMP) function, a Dynamic Resource Allocation (DRA) function, and the like.

In an embodiment, the one or more non-real-time SON functional elements, the one or more time-sensitive SON functional elements, and the one or more non-real-time RRM functional elements, the one or more time-sensitive RRM functional elements, at the Non-RT-RIC and the Near-RT RIC (124) of the O-RAN architecture implements for a functional execution split localization of respective functions.

In an embodiment, the xAPPs and the rAPPs may further register with the one or more E2 nodes for data ahead in time. In an embodiment, the xAPPs and the rAPPs may query, via the at least one of the non-RT RIC (122) and the Near-RT RIC (124), for resident information of the one or more E2 nodes, upon registration. In an embodiment, the xAPPs and the rAPPs may modify, an appropriate data collection technique, to request the one or more E2 nodes for at least one of a PUSH mechanism and a PULL mechanism with appropriate timer mechanism adjustments, based on the one or more E2 node response.

In an embodiment, the Near-RT RIC (124) may access via at least one of the xAPPs associated with the O-RAN and the EMN entity or the NMS entity, one or more Performance Monitoring (PM) counters, by requesting respective E2 Nodes via the E2 interface or via the O1 interface, respectively.

In an embodiment, executing the one or more time-sensitive RRM functional elements comprise a global view of associated neighbor modules (110) and one or more respective decisions corresponding to the one or more time-sensitive RRM functional elements.

In an embodiment, the EMS entity provides a complete Fault, Configuration, Accounting, Performance and Security (FCAPS) functions to each type of the one or more E2 nodes via the O1 interface. In an embodiment, the at least one of the EMS entity and the NMS entity implements a Domain-Centralized SON (DC-SON) functional element and a Cross Domain-Centralized SON (CD C-SON) functional element associated with the SMO module (110), respectively. In an embodiment, the DC-SON functional element and the CD C-SON functional element comprise at least one of a Traffic Area (TA) optimization function, and an end-to-end Quality of Experience (QoE) optimization function. In an embodiment, the EMS entity for the one or more E2 nodes of the DC-SON may assigned for one network vendor, and the one or more E2 nodes of the Radio Access Network (RAN) may assigned for different network vendors.

In one embodiment, a system of localization of a first set of instructions for SON (interchangeably referred to as (SON functions and algorithms hereinafter) which may be time sensitive may be based in the Near-Real time RIC (124), while a second set of instructions which may be time insensitive but are needed during the initial stage or system bring up stage may be running in the Non-Real Time RIC (non-RT-RIC) (122) but not limited to it. That way, the interface between the SON and the RAN nodes may become open interface and hence can resolve the issues due to usage of Multi-Vendor RAN nodes within the HetNets.

In one embodiment the Radio resource management (RRM) based instructions such as Call/Connection Admission Control (CAC), Radio Bearer Control (RBC), Connection Mobility Control (CMC), Measurement Control (MC), Inter Cell Interference Control (ICIC),Co-ordinated Multipoint (CoMP), Dynamic Resource Allocation (DRA), and the like may be running on the Near-Real Time RIC (124). This enables the RRM to be localized in a centralized execution site and the functionalities can have a global view of the associated neighbors and their RRM decisions, to take its optimal decisions. For example, neighbor module information, neighbor cell information from a database or the like.

In an embodiment, a centralised SON and may be integrated with an RRM within the O-RAN Architecture for a HetNet Deployment. In yet another embodiment, deployment of the Non real time SON or RRM entities can be implemented in the EMS entity (not shown in FIG. 1).

In yet another embodiment the CD C-SON functionality can be supported at a network management system (NMS) (not shown in FIG. 1) as well. The SON functions/algorithms which have impacts on both RAN nodes and the 5GC nodes can be executed at the NMS management entity. Since, the NMS management entity communicates with RAN nodes and the 5GC Nodes with O1 Interface, which may an Open interface, the End-to-End network optimization may be Vendor agnostic.

In another embodiment, an onsite data capture, storage, matching, processing, decision-making and actuation logic may be coded using Micro-Services Architecture (MSA) but not limited to it. A plurality of microservices may be containerized and may be event based in order to support portability.

In an embodiment, the network architecture (100) may be modular and flexible to accommodate any kind of changes in the SMO module (110), and the Near-RT RIC (124). The SMO module (110), and the Near-RT RIC (124) configuration details can be modified on the fly.

In an embodiment, the SMO module (110) may be remotely monitored and the data, application, and physical security of the SMO module (110) may be fully ensured. In an embodiment, the data may get collected meticulously and deposited in a cloud-based data lake to be processed to extract actionable insights. Therefore, the aspect of predictive maintenance can be accomplished.

In an exemplary embodiment, a communication network (108) may include, by way of example but not limitation, at least a portion of one or more networks having one or more nodes that transmit, receive, forward, generate, buffer, store, route, switch, process, or a combination thereof, etc. one or more messages, packets, signals, waves, voltage or current levels, some combination thereof, or so forth. A network may include, by way of example but not limitation, one or more of: a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fiber optic network, some combination thereof.

In another exemplary embodiment, the centralized server (112) may be included in architecture (100). The centralized server (112) may include or comprise, by way of example but not limitation, one or more of: a stand-alone server, a server blade, a server rack, a bank of servers, a server farm, hardware supporting a part of a cloud service or system, a home server, hardware running a virtualized server, one or more processors executing code to function as a server, one or more machines performing server-side functionality as described herein, at least a portion of any of the above, some combination thereof.

In an embodiment, the one or more first computing devices (104), the one or more mobile devices (not shown in FIG. 1) may communicate with the SMO module (108) via set of executable instructions residing on any operating system, including but not limited to, Android™, iOS™, Kai OS™ and the like. In an embodiment, one or more first computing devices (104) and the one or more mobile devices may include, but not limited to, any electrical, electronic, electro-mechanical or an equipment or a combination of one or more of the above devices such as mobile phone, smartphone, Virtual Reality (VR) devices, Augmented Reality (AR) devices, laptop, a general-purpose computer, desktop, personal digital assistant, tablet computer, mainframe computer, or any other computing device, wherein the computing device may include one or more in-built or externally coupled accessories including, but not limited to, a visual aid device such as camera, audio aid, a microphone, a keyboard, input devices for receiving input from a user such as touch pad, touch enabled screen, electronic pen, receiving devices for receiving any audio or visual signal in any range of frequencies and transmitting devices that can transmit any audio or visual signal in any range of frequencies. It may be appreciated that the to one or more first computing devices (124), and the one or more mobile devices may not be restricted to the mentioned devices and various other devices may be used. A smart computing device may be one of the appropriate systems for storing data and other private/sensitive information.

Figure 2A:
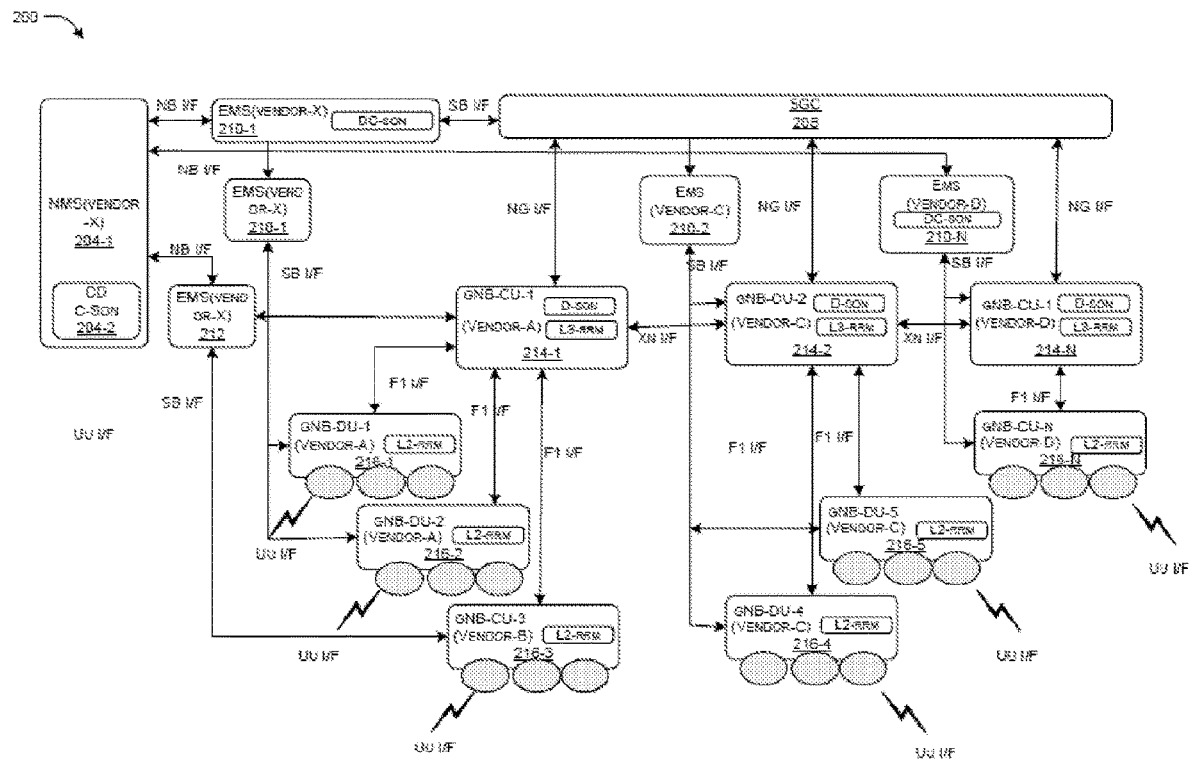
FIG. 2A illustrates an exemplary block diagram representation of existing 5G Heterogenous Networks (HetNet) deployment scenario, in accordance with an embodiment of the present disclosure.

FIG. 2A illustrates an exemplary block diagram representation of existing 5G HetNet deployment scenario. In the 5G HetNet deployment scenario, the operator may use the management entities like NMS from a different vendor, set of EMSs from a different set of vendors, RAN nodes like gNB-CUs from a different set of vendors and gNB-DUs from a different set of vendors. The set of few issues that the operator may faces in the deployed HetNet of FIG. 2A may be as follows:

D-SON of gNB-CU-1 and gNB-CU-2 (214-1, 214-2) may not coordinate well as both are from different vendors, though they communicate each other via open Xn interface.

D-SON of gNB-CU-2 (214-2) and the Hybrid SON of gNB-CU-n (216-n) (D-SON+D C-SON) may not coordinate well as both are from different vendors, though they communicate each other via open Xn interface.

C-SON can be realized as either collocated with management entities [Like EMS/NMS] or as a standalone entity. Integrating the C-SON as a standalone entity with RAN nodes will be a nightmare, as the interface is left to implementation.

CD C-SON (204-2) in the NMS (204-1) may impact the performance of the D C-SON and D-SON functionalities, operating in the Multivendor environment.

Integrating the 3rd party SON solutions partially in the HetNet, leads to degradation of the overall KPIs.

L3-RRM coordination across the neighborg NB-CUs (214-1, 214-2, 214-N) may be lacking irrespective of the same or multivendor scenarios, which will have impact on the overall Key Performance Indicators (KPI) performance.

L3-RRM and L2-RRM coordination across the multi-vendor gNB-CU (214-1, 214-2, 214-N) and gNB-DUs (216-1, 216-2, 216-3, 216-4, 216-5, 216-N) may have impact on the dynamic resource sharing and allocation.

The SON and RRM, being a proprietary implementation, have significant impact on the overall performance, though multi-vendor coordinates each other across the Xn interface, because each algorithm behaves differently and have their own limitations. Even if the vendors are ready to integrate with the third-party solutions [SON and/or RRM], vendors may not deterministically quantify/confirm the output performance, mainly due to which vendor's solutions. Always ends with clash between the agreed vendors. One possible solution to resolve these issues or limitations may be to make the interface between SON solutions and the interacting Radio Access Network (RAN) nodes, open interface as much as possible. An Open Radio Access Network (O-RAN) alliance may be a world-wide community of mobile network operators, vendors, and research and academic institutions operating in the RAN industry. O-RAN alliance mission may be to re-shape the RAN industry towards more intelligent, open, virtualised and fully interoperable mobile networks. The new O-RAN standards may be enabling a more competitive and vibrant RAN supplier ecosystem with faster innovation to improve user experience. O-RAN based mobile networks will at the same time improve the efficiency of RAN deployments as well as operations by the mobile operators. However, conventional systems and methods may not provide mechanisms to realize the mobility robustness optimization function in an O-RAN Architecture.

Figure 2B:
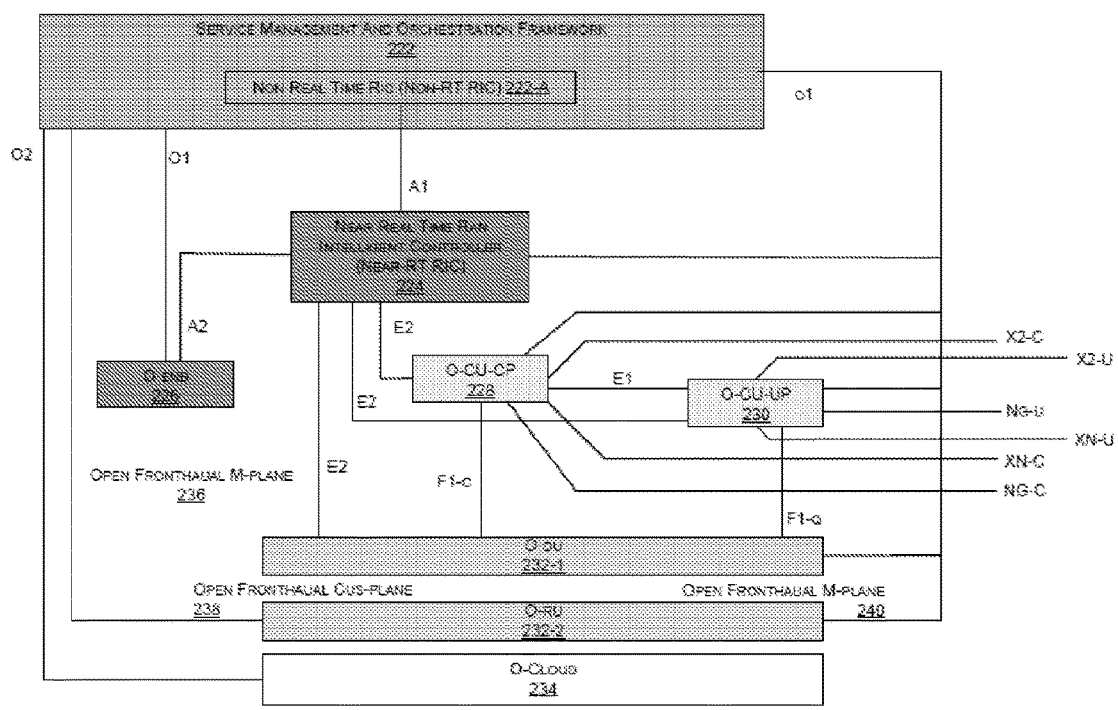
FIG. 2B illustrates an exemplary block diagram representation of existing open Radio Access Network (o-RAN) architecture, in accordance with an embodiment of the present disclosure.

FIG. 2B illustrates an exemplary an exemplary block diagram representation of existing open Radio Access Network (o-RAN) architecture (220), in accordance with an embodiment of the present disclosure.

The system architecture (220) is an O-RAN architecture. The rApps (not shown in FIG. 2B) may include an interface where external information can be fed to an operator network. The Near-RT RIC (224) may be a logical function that enables near-real-time control and optimization of RAN elements and resources via fine-grained data collection and actions over E2 interface, as shown in FIG. 4. The Near-RT RIC (224) may include Artificial Intelligence (AI)/Machine Learning (ML) workflow including model training, inference and updates which are handled by the xApps (not shown in FIG. 2B).

Further, the Non-RT RIC (222-A) may include a logical function within Service Management and Orchestration (SMO) framework (222), that may drive the content carried across the A1 interface, as shown in FIG. 2B. The Non-RT RIC (222-A) may include a Non-RT RIC Framework and the Non-RT RIC Applications such as the rApps. Furthermore, the Non-RT RIC framework, may function internal to the SMO framework (22), that logically terminates the A1 interface to the Near-RT RIC (224) and may expose set of internal SMO services needed for their runtime processing, to the rApps, via a R1 interface. The Non-RT RIC framework may function within the non-RT RIC (222-A) and may provide AI/ML workflow including model training, inference and updates needed for rApps.

Further, the O1 interface from the O-RAN components may terminate at the SMO framework (222). A O-CU-CP (228) may be a logical node hosting a Radio Resource Control (RRC) and a control plane part of a PDCP protocol. Further, an O-CU-UP (230) may be a logical node hosting the user plane part of the PDCP protocol and a SDAP protocol. An (232-1) may be a logical node hosting Radio Link Control (RLC)/Medium Access Control (MAC)/High-Physical (PHY) layers based on a lower layer functional split. E2 node may be a logical node terminating E2 interface. Further, a O-RAN nodes may be terminating at E2 interface that are, for NR access O-CU-CP (228), O-CU-UP (230), O-DU (232-1) or any combination, and for E-UTRA access such as O-eNB (226). The Non-RT RIC applications such as rApps may be a modular application that leverage the functionality exposed via the R1 interface of the non-RT RIC framework, to provide added value services relative to RAN operation. The added value services relative to RAN operation includes, but not limited to, driving the A1 interface, recommending values and actions that may be subsequently applied over the O1/O2 interface and generating "enrichment information" for the use of other rApps, and the like. The rApps may function within the non-RT RIC (222-A) that enables non-real-time control and optimization of RAN elements and resources and policy-based guidance to the applications/features in Near-RT RIC (224). Further, the Near-RT RIC applications such as x-App may run on the Near-RT RIC (224). Such application may be likely to consist of one or more microservices and at the point of on-boarding may identify which data it consumes and which data it provides. The application is independent of the Near-RT RIC (224) and may be provided by any third party. The E2 enables a direct association between the xApps and the RAN functionality.

Further, a O-Cloud (234) may be a cloud computing platform which includes a collection of physical infrastructure nodes that meet O-RAN requirements to host the relevant functions of Near-RT RIC (224), O-CU-CP (228), O-CU-UP (230), and O-DU (232-1), the supporting software components (such as Operating System, Virtual Machine Monitor, Container Runtime, etc.) and the appropriate management and orchestration functions. In addition, O1 interface may be between SMO framework (222) and O-RAN managed elements, for operation and management, by which may be Fault, Configuration, Accounting, Performance, Security, (FCAPS) management, Physical Network Function (PNF) software management, file management may be achieved. Further, the O2 interface may be between SMO framework (222) and the O-Cloud (234) for supporting O-RAN virtual network functions. Furthermore, an A1 interface between the Non-RT RIC (222-A) and the Near-RT RIC (224). The purpose of the A1 interface may be to enable the non-RT RIC function to provide policy-based guidance, ML model management and enrichment information to the Near-RT RIC function so that the RAN can optimize e.g., Radio Resource Management (RRM) under certain conditions. Thereafter, the E2 interface may be to connect the Near-RT RIC (224) and one or more O-CU-CPs (228), one or more O-CU-Ups (230), and one or more O-DUs (232-1). A R1 interface may be between the rApps and a non-RT RIC framework.

Although not shown in the FIG. 2B, the O-eNB (226) may not support O-DU (232-1) and O-RU (232-2) functions with an Open Fronthaul interface between them. The management side includes SMO framework containing a Non-RT-RIC function. The O-Cloud (234), on the other hand, is a cloud computing platform comprising a collection of physical infrastructure nodes that meet O-RAN requirements to host the relevant O-RAN functions (such as Near-RT RIC (224), O-CU-CP (228), O-CU-UP (230) and O-DU (232-1) and the like.), the supporting software components (such as Operating System, Virtual Machine Monitor, Container Runtime, etc.) and the appropriate management and orchestration functions. As shown in the FIG. 2B, the O-RU (232-2) terminates the Open Fronthaul M-Plane interface towards the O-DU (232-1) and the SMO framework (222).

Figure 3A:
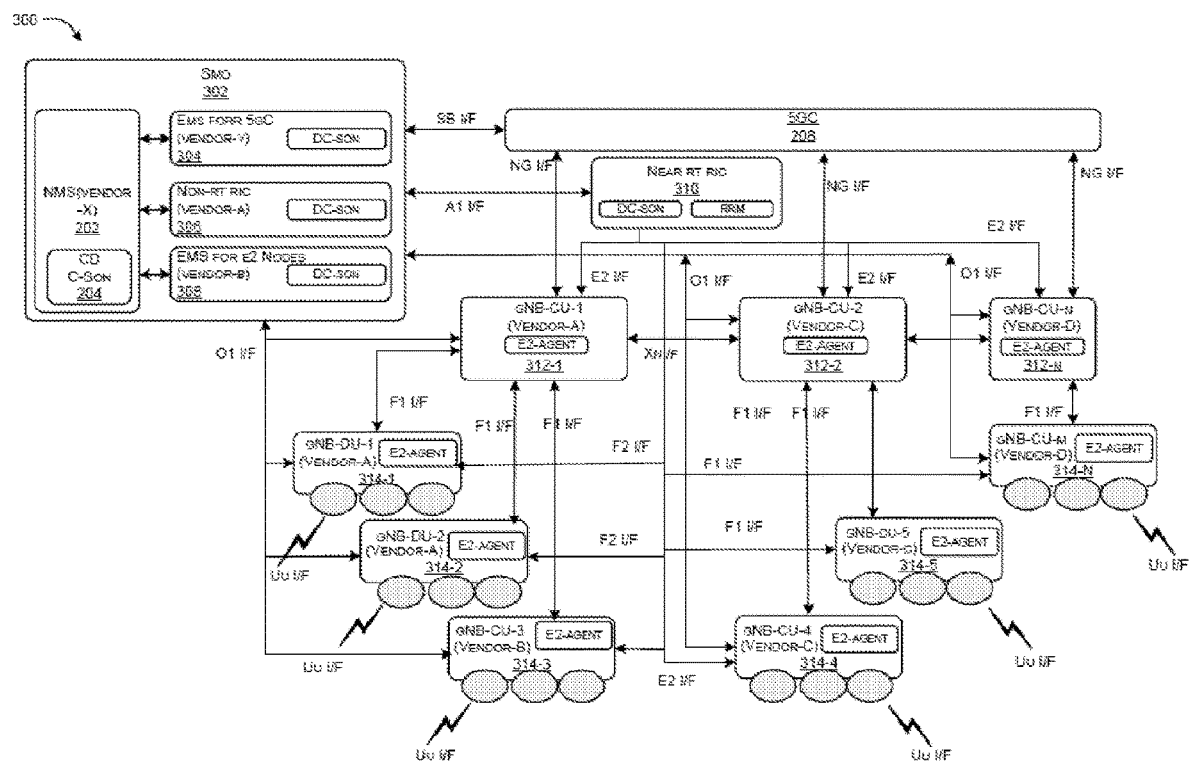
FIG. 3A illustrates an exemplary block diagram representation of a system architecture, in accordance with an embodiment of the present disclosure.
Figure 3B:
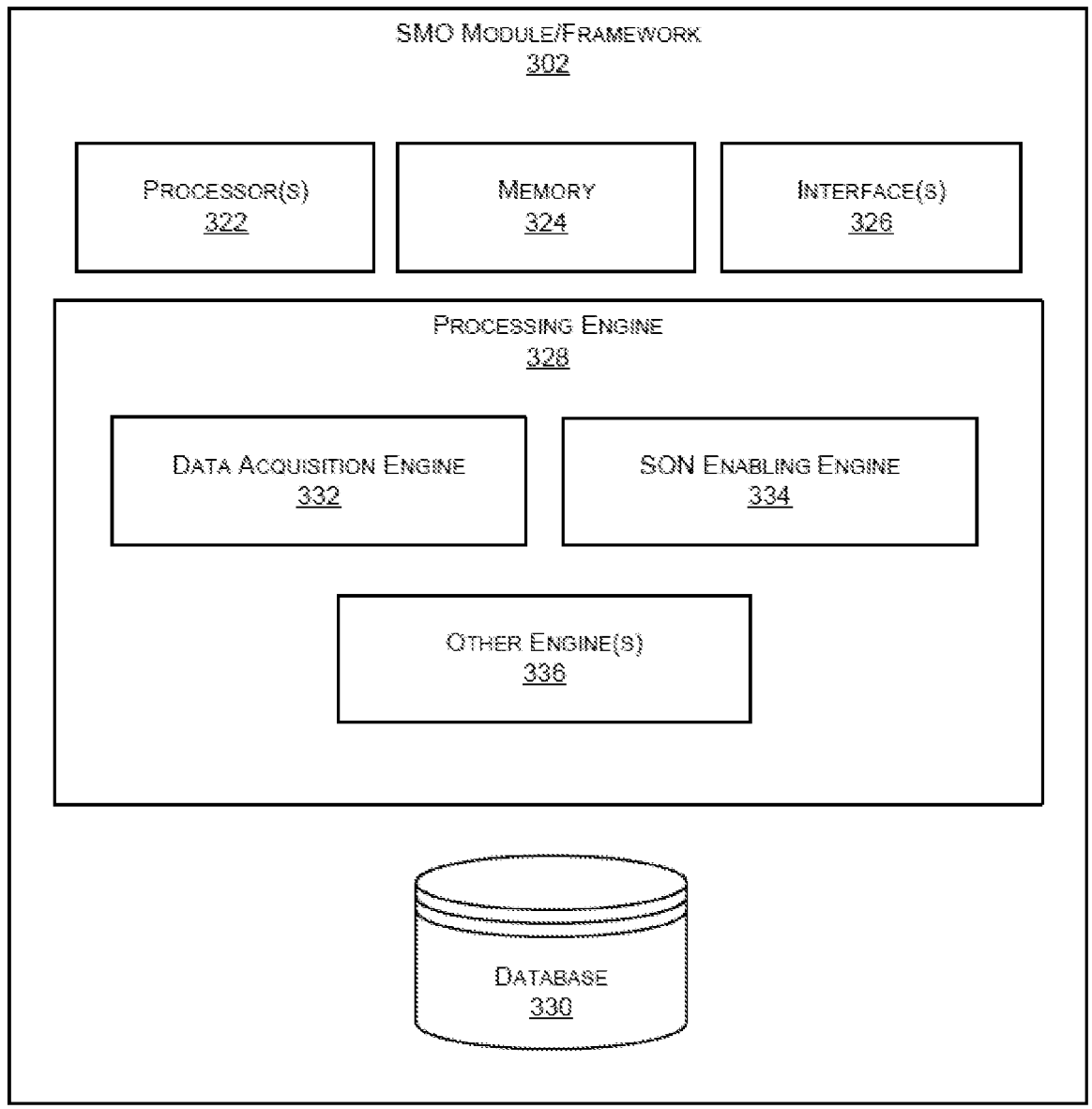
FIG. 3B illustrates an exemplary detailed block diagram of a SMO module/framework for enabling self-organizing networks in an Open Radio Access Network (O-RAN), in accordance with an embodiment of the present disclosure.

FIG. 3A illustrates an exemplary block diagram representation of a system architecture (300), in accordance with an embodiment of the present disclosure. The system architecture (300) may be an O-RAN architecture with a Centralized SON (C-SON) and Radio Resource Management (RRM) integration. As illustrated in FIG. 3B, in an aspect, the C-SON and RRM integration within the O-RAN Architecture for a Fifth Generation (5G) Heterogenous Network (HetNet) Deployment (e.g., 5G core (5GC) (208)) is shown. Here, the time-sensitive distributed C-SON and RRM functionalities can be supported within the Near-RT RIC (310). The time-insensitive distributed C-SON functionalities can be supported either in the Management entities (202) such as EMS or within the Non-RT RIC (306), where both exist within the SMO framework (302) of the O-RAN Architecture (300).

In yet another deployment the Non real time SON or RRM entities can be implemented in the EMS (304, 308). The EMS context for RAN nodes [E2 nodes] may be a Domain C-SON from one vendor and the E2 nodes themselves can be from different vendors. Here EMS (SON and/or RRM functional elements) in SMO communicates with E2 nodes via the O1 interface.

In yet another embodiment the Non-RT RIC (306) and associated Domain C-SON (SON or RRM functional elements) can be from one vendor and the E2 nodes can be from different vendors. Here, since the Non-RT RIC (306) in SMO communicates with Near-RT RIC (310) via the A1 interface, which may be an open interface. Also, the Near-RT RIC (310) communicates with the E2 nodes via the E2 interface, which may open interface, the D C-SON functionality within Non-RT RIC (306) may become entity agnostic.

The EMS context for 5G Core or 5GC (208) nodes and hence its D C-SON can be from one entity and the 5GC nodes can be from different entities. Here, since the EMS in SMO communicates with 5GC nodes via the O1 interface, which may open interface, the D C-SON functionality within EMS context may become entity agnostic. Here, it may intended that, the D C-SON may going to optimize the 5GC nodes, so that it may aid in optimizing the End-to-End Quality of Experience (QoE) of the UEs, along with the support of C-SON for RAN nodes.

In yet another embodiment the CD C-SON functionality can be supported at the NMS as well. Those SON functions/algorithms which have impacts on both RAN nodes and the 5GC nodes can be executed at the NMS management entity. Since, the NMS management entity communicates with RAN nodes and the 5GC Nodes with O1 Interface, which may an Open interface, the End-to-End network optimization may be Entity agnostic.

In a preferred embodiment, the RRM functionalities such as the CAC, RBC, CMC, MC, DRA, and the like may be implemented at the Near-RT RIC (310) with a plurality of a third set of instructions (interchangeably referred to as container applications or xAPPs) for each functionality. A group of such functionalities can also be combined and executed in the xApp. Further in this embodiment the time sensitive SON functionalities like MLB, MRO, ICIM, FHM, FHO, CCO, RACH Optimization, ANR, PCI, and the like may be implemented at the Near-RT RIC (310) with separate xAPP for each functionality. A group of such functionalities can also be combined and executed in the xApp. The combination of functionalities is left to the implementation. Here, xAPP at Near-RT RIC can access the required PM Counters by requesting the relevant E2 Nodes via E2 interface. Also, it can the access the same from the management entities via O1 interface.

In another embodiment the non-real-time SON functionalities such as Initial PCI, Initial ANR, Energy Saving, Cell Outage Management, Sick cell and Sleeping cell management, Traffic steering, TA Optimization, and the like can be implemented either at the Non-RT RIC (306) using separate rAPP for each functionality or the management entities like EMS context or NMS at the SMO. A group of such functionalities can also be combined and executed in an rApp. The combination of functionalities may left to the implementation. In this embodiment, the SON functional and control information can be exchanged either directly via the O1 interface or via A1 and the E2 Interfaces with E2 nodes but not limited to the like. The E2 Agent in each of the E2 Nodes, then consequently apply the RRM and SON function related decisions from the RIC at the E2 termination point by interacting with the E2 application functions of E2 nodes.

In the proposed embodiment under a plurality multi-entity EMSs in a HetNet deployment, interoperability issues can be avoided.

FIG. 3B illustrates an exemplary representation of the proposed Service Management and Orchestration (SMO) module/framework (302) for enabling self-organizing networks in an Open Radio Access Network (O-RAN), in accordance with an embodiment of the present disclosure. In an aspect, the SMO module/framework (302) may include one or more processor(s) (322). The one or more processor (s) (322) may be implemented as one or more microprocessors, microcomputers, microcontrollers, edge or fog microcontrollers, digital signal processors, central processing units, logic circuitries, and/or any devices that process data based on operational instructions. Among other capabilities, the one or more processor(s) (322) may be configured to fetch and execute computer-readable instructions stored in a memory (324) of the SMO module/framework (302). The memory (324) may store one or more computer-readable instructions or routines in a non-transitory computer readable storage medium, which may be fetched and executed to create or share data packets over a network service. The memory (324) may comprise any non-transitory storage device including, for example, volatile memory such as RAM, or non-volatile memory such as EPROM, flash memory, and the like.

In an embodiment, the SMO module/framework(302) may include an interface(s) (326). The interface(s) (326) may also provide a communication pathway for one or more components of the SMO module/framework (302). Examples of such components may include, but are not limited to, processing unit/engine(s) (328) and a database (330).

The processing unit/engine(s) (328) may be implemented as a combination of hardware and programming (for example, programmable instructions) to implement one or more functionalities of the processing engine(s) (328). In examples described herein, such combinations of hardware and programming may be implemented in several different ways. For example, the programming for the processing engine(s) (328) may be processor executable instructions stored on a non-transitory machine-readable storage medium and the hardware for the processing engine(s) (328) may comprise a processing resource (for example, one or more processors), to execute such instructions. In the present examples, the machine-readable storage medium may store instructions that, when executed by the processing resource, implement the processing engine(s) (328). In such examples, the SMO module/framework (302) may comprise the machine-readable storage medium storing the instructions and the processing resource to execute the instructions, or the machine-readable storage medium may be separate but accessible to the SMO module/framework (302) and the processing resource. In other examples, the processing engine(s) (328) may be implemented by electronic circuitry. Further, the SMO module/framework (302) may include Machine Learning (ML) modules.

The processing engine (328) may include one or more engines selected from any of a data acquisition engine (332), a SON enabling engine (334), and other engines (336). The data acquisition engine (332), the SON enabling engine (334) may include Machine Learning (ML) modules. The processing engine (328) may further edge based micro service event processing but not limited to the like.

In an embodiment, the SON enabling engine (334) may assign at least one of one or more non-real-time Self-Organizing Network (SON) functional elements and one or more non-real-time Radio Resource Management (RRM) functional elements in an Element Management System (EMS) entity associated with the SMO module (110). In an embodiment, the non-real-time SON functional elements include, but not limited to, at least one of an initial Physical layer Cell Identity (PCI) function, an initial Automatic Neighbor Relation (ANR) function, an Energy Saving (ES) function, a cell outage management function, a sick cell and sleeping cell management function, a traffic steering function, a Timing advance (TA) optimization function, and the like.

In an embodiment, the EMS entity may communicate with one or more E2 nodes associated with a Radio Access Network (RAN), via an O1 interface. In an embodiment, the one or more non-real-time SON functional elements are implemented in at least one of, the Non-RT RIC (122) using individual rAPPs associated with the o-RAN, for each functional element, and the EMS entity or a Network Management System (NMS) entity associated with the SMO module (110). In an embodiment, In an embodiment, the data acquisition engine (332) may exchange at least one of non-real-time SON functional information and non-real-time SON control information with the one or more E2 nodes via at least one of the O1 interface, an A1 interface, and an E2 interface. In an embodiment, the one or more E2 nodes execute, via one or more E2 agents, the non-real-time Self-Organizing Network (SON) functional elements and one or more non-real-time Radio Resource Management (RRM) functional elements from the Non-RT RIC (122) received at an E2 termination point by interacting with one or more E2 application functional elements of the one or more E2 nodes. In an embodiment, executing the one or more time-sensitive RRM functional elements in the Near-RT RIC (124) corresponds to localizing in a centralized execution site. In an embodiment, the SON enabling engine (334) may execute, for each function, one or more time-sensitive SON functional elements and the one or more time-sensitive RRM functional elements using individual xAPPs associated with the o-RAN. In an embodiment, for each function, the one or more time-sensitive SON functional elements are implemented in the Near-RT RIC (124) using individual xAPPs associated with the o-RAN.

Figure 4A:
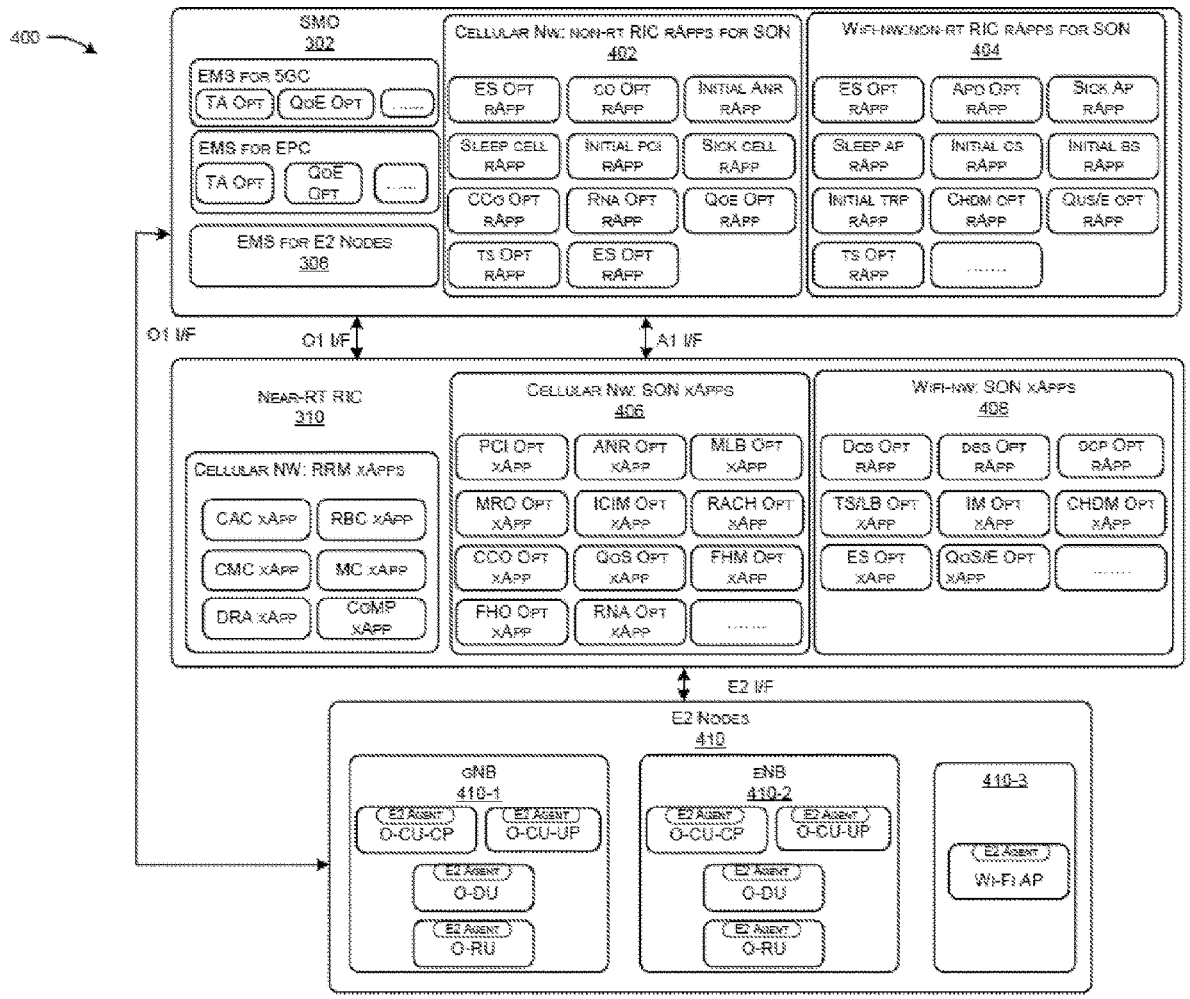
FIG. 4A illustrates an exemplary architecture that depicts implementation localization of SON and RRM functions in a network using an O-RAN architecture with an embodiment of the present disclosure.
Figure 4B:
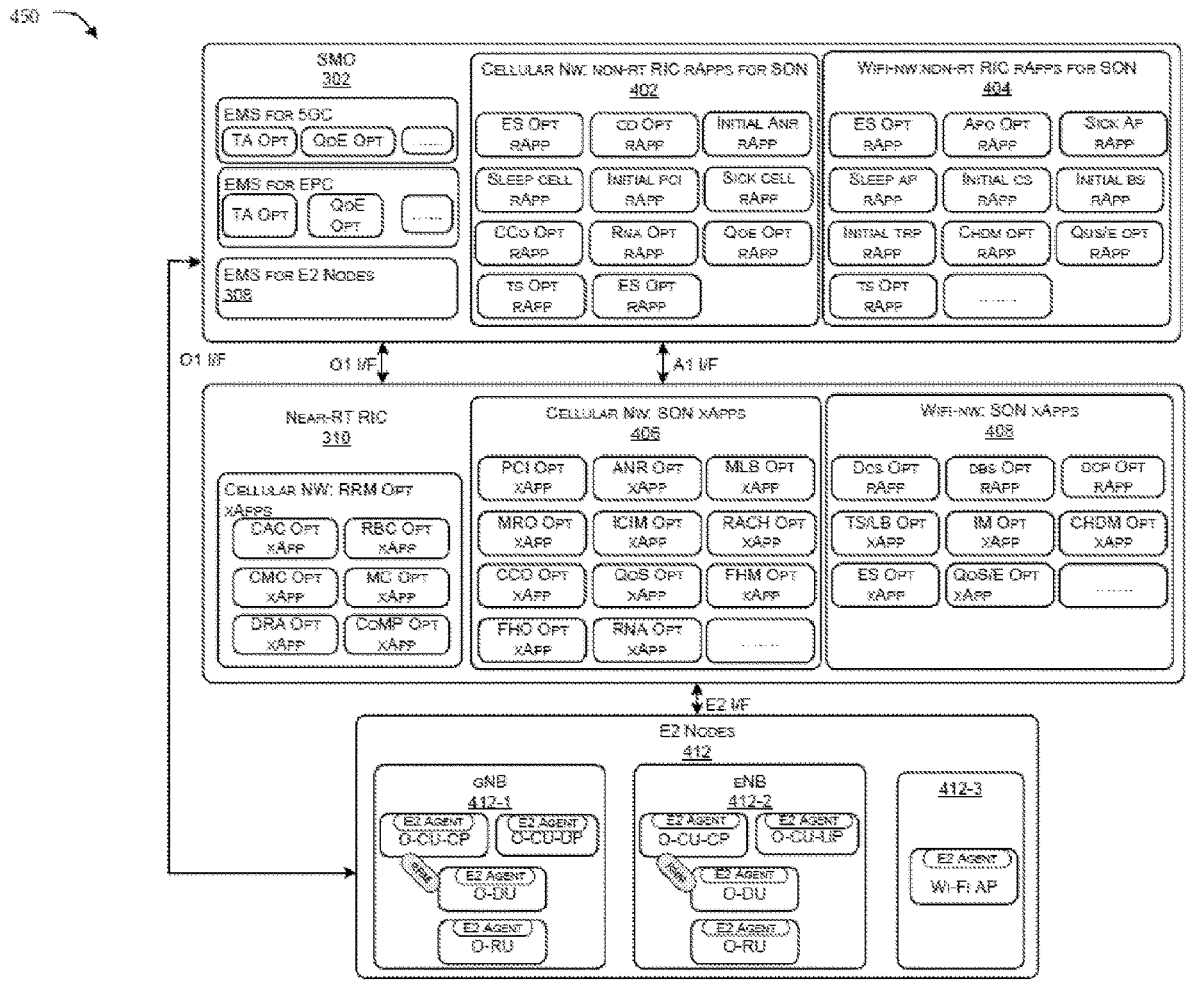
FIG. 4B illustrates an exemplary architecture that depicts implementation localization of ONLY the SON functions in a network using an O-RAN architecture in accordance with an embodiment of the present disclosure.

FIGS. 4A-4B illustrate exemplary block diagram representations of a O-RAN functional architecture for SON/RRM Support (400), in accordance with an embodiment of the present disclosure.

The r-Apps may be having an interface where external information can be fed to the Operator network. The Near-RT RIC (306) may be a logical function that enables near-real-time control and optimization of RAN elements and resources via fine-grained data collection and actions over E2 interface, as shown in FIGS. 4A and 4B. The Near-RT RIC (310) may include Artificial Intelligence (AI)/Machine Learning (ML) workflow including model training, inference and updates which are handled by the xApps.

Further, the Non-RT RIC (306) may include a logical function within the SMO (302), that may drive the content carried across the A1 interface, as shown in FIG. 3A. The Non-RT RIC (306) may include a Non-RT RIC Framework and the Non-RT RIC Applications such as the rApps (404). Furthermore, the Non-RT RIC framework, may function internal to the SMO module (302), that logically terminates the A1 interface to the Near-RT RIC (310) and may expose set of internal SMO services needed for their runtime processing, to the rApps (404), via the R1 interface. The Non-RT RIC framework may function within the Non-RT RIC (306) and may provide AI/ML workflow including model training, inference and updates needed for rApps (404). The O-RAN functional Architecture for SON/RRM support, where the RRM algorithms executed at the relevant E2 Nodes and the Optimization of these RRM algorithms may be done by relevant RRM Optimization xApps (406) running at Near-RT RIC. This gives flexibility for the Vendors to have their own implementation of RRM algorithms, but their RRM algorithm Optimization may be done by the relevant RRM Opt xApps at Near-RT RIC to make it Vendor agnostic. The FIG. 4B illustrates the Holistic O-RAN functional Architecture for SON/RRM support, where the RRM algorithms executed at the relevant E2 Nodes and the Optimization of these RRM algorithms may be done by relevant RRM Optimization xApps running at Near-RT RIC. This gives flexibility for the Vendors to have their own implementation of RRM algorithms, but their RRM algorithm Optimization may be done by the relevant RRM Opt xApps at Near-RT RIC to make it Vendor agnostic.

Figure 5A:
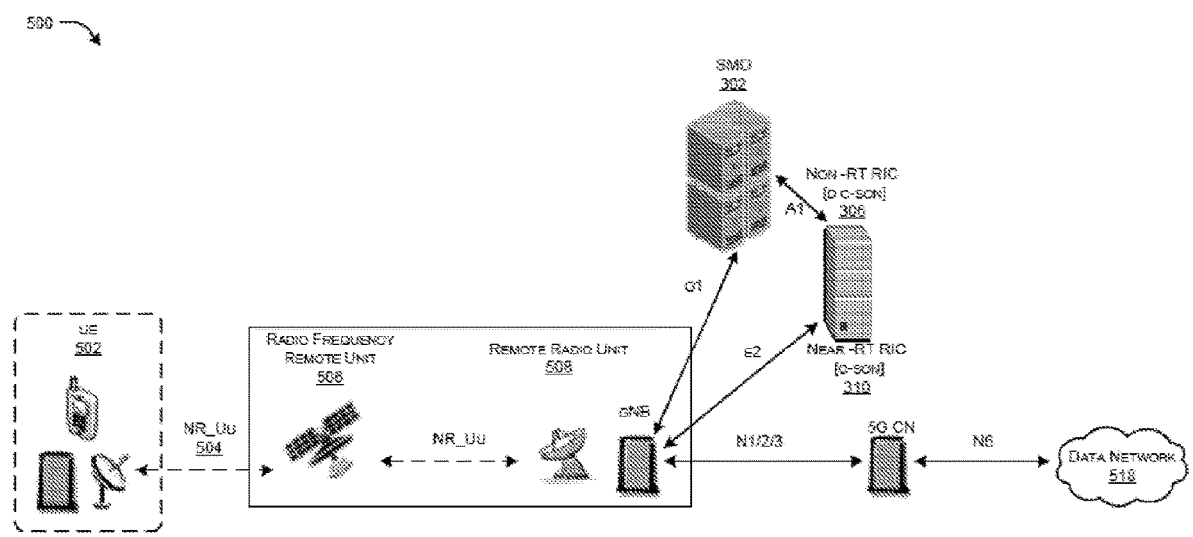
FIG. 5A provides an illustrated embodiment of the transparent satellite enabled NR-RAN, with integrated O-RAN architecture in accordance with an embodiment of the present disclosure.
Figure 5B:
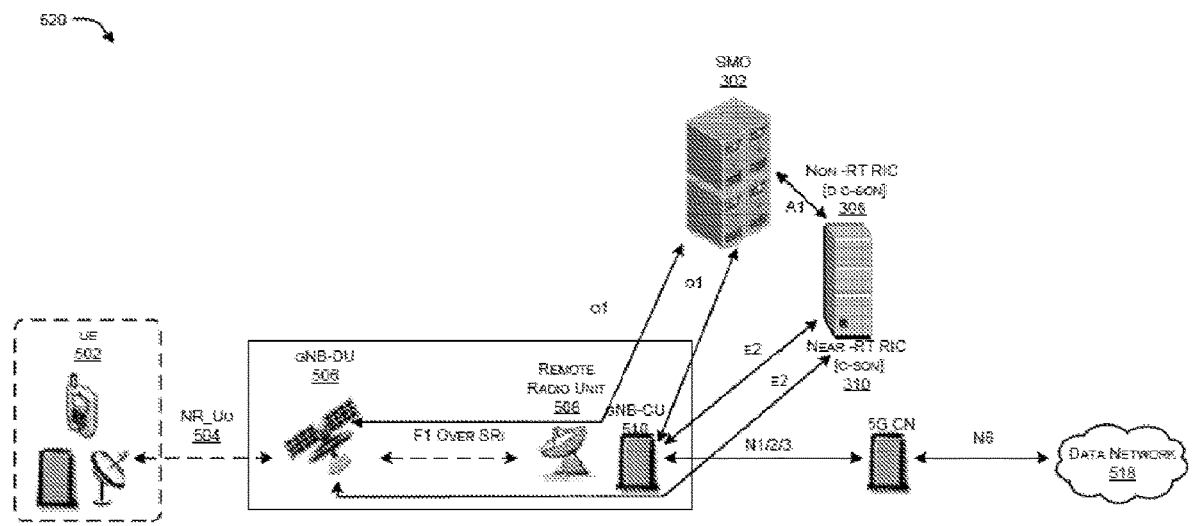
FIG. 5B may an illustrated embodiment of the 5GS with regenerative satellite enabled NR-RAN and distributed gNB, with integrated O-RAN architecture in accordance with an embodiment of the present disclosure.
Figure 5C:
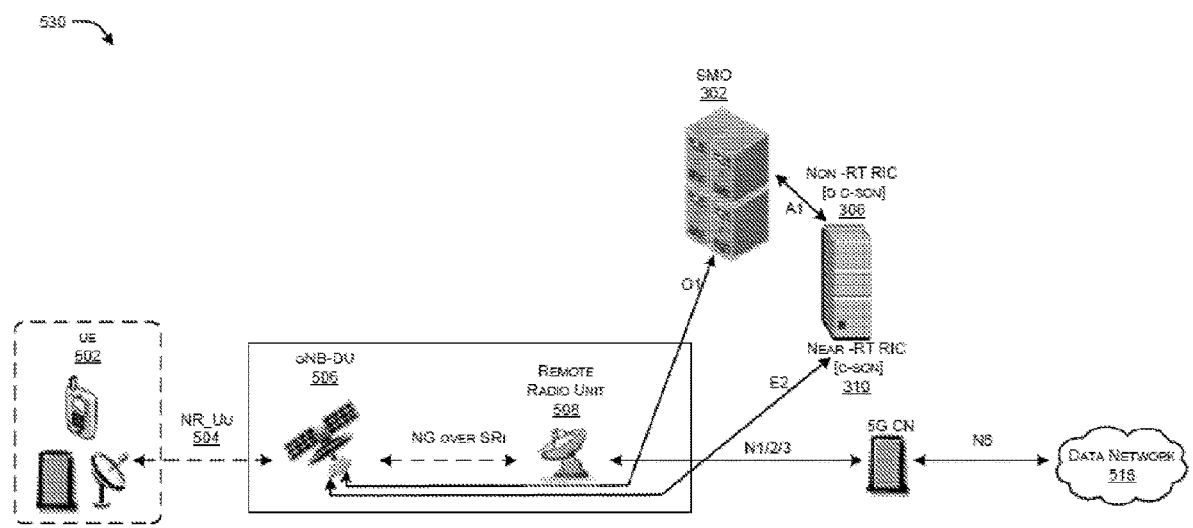
FIG. 5C may an illustrated embodiment of the 5GS with regenerative satellite enabled NR-RAN and onboard gNB in accordance with an embodiment of the present disclosure.
Figure 5D:
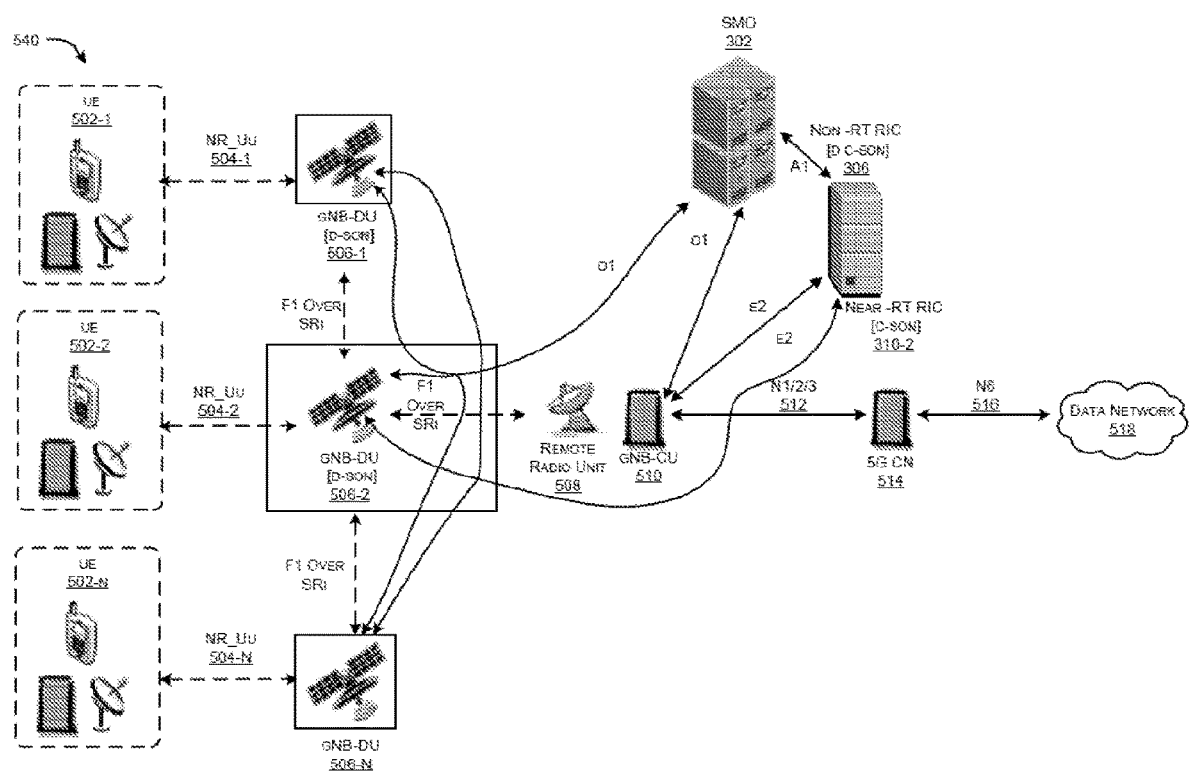
FIG. 5D may an O-RAN enabled 5GS with regenerative satellite enabled NR-RAN, with ISL for regional or global in accordance with an embodiment of the present disclosure.

FIGS. 5A-5C illustrate exemplary block diagram representations of O-RAN enabled 5GS with one or more transparent satellites (506), in accordance with an embodiment of the present disclosure. FIG. 5A illustrates an illustrated embodiment of the transparent satellite enabled NR-RAN, with integrated O-RAN architecture. In this scenario, since the satellite may introduced over the Uu interface to extend the coverage, meaning the gNB is still on the ground, the impact of SON/RRM location within the O-RAN framework may be very less. Since the one way end-to-end latency may very high due to GEO/MEO/LEO satellites, care needs to be taken w.r.t UE (502) assisted Interference mitigation functionalities and also for the Dynamic Resource allocation functionalities. FIG. 5B may an illustrated embodiment of the 5GS with regenerative satellite enabled NR-RAN and distributed gNB, with integrated O-RAN architecture. In this scenario, the gNB-DU (506) may on the satellite and gNB-CU (510) may be on the ground. That means both O-RU and O-DU may be on satellite. Here, the impact of SON/RRM location within the O-RAN framework may be very less. Since the one way end-to-end latency may very high due to GEO/MEO/LEO satellites, care needs to be taken w.r.t UE assisted Interference mitigation functionalities and also for the Dynamic Resource allocation [DRA] functionalities. DRA can be placed either at gNB-DU (506) on satellite, at gNB-CU (510) on the ground or at Near-RT RIC (310). Also, care needs to be taken w.r.t Energy Saving (ES) functionality, as it may going to affect the larger coverage area, while deciding to switch off the gNB-DU (506), which may on the satellite. Further, FIG. 5C illustrates the 5GS with regenerative satellite enabled NR-RAN and on-board gNB, with integrated O-RAN architecture. The entire set of O-RU, O-DU and O-CU may be placed on the satellite. The SON/RRM algorithms, which are needed to optimize only the RAN nodes on satellite, may better placed on the satellite itself in the form of D-SON. To optimize both terrestrial and non-terrestrial network nodes, then the C-SON placed on the Near-RT RIC may be more optimal, as mentioned in the above scenarios. Further, FIG. 5D illustrates the 5GS with regenerative satellite enabled NR-RAN, with ISL for regional or global, with integrated O-RAN architecture. In this scenario, both the O-RU and O-DU are placed on the satellite and O-CU may on the ground. Here, the impact of SON/RRM location within the O-RAN framework may be very less, except the delay considerations due to satellites as discussed above. The functionalities like DRA and CoMP can be placed within O-DU on the satellite in the form of D-SON for optimal performance among NTN nodes. Across the Terrestrial network nodes and NTN nodes, C-SON can plan an optimal role.

In all the satellite O-RAN implementation scenarios, a new mechanism that implements proactive PULL and PUSH mechanisms may proposed in the O-RAN E2/RIC interfaces to obtain data earlier so that the timing and the backhaul delays are mitigated. An architecture when in the xAPP or an rAPP can register with an E2 node for data ahead in time may proposed. A mechanism may provided for the RIC to query if the E2 node may resident in a satellite or if a transparent satellite may present in the RAN access side. Based on the E2 node response, the appropriate data collection mechanism may modified to ask for either a PUSH or a PULL mechanism with appropriate timer mechanism adjustments.

In another embodiment, if the E2 node may across a satellite from a RIC, the RIC has the provision to insert a Proxy RIC into the E2.

Figure 6:
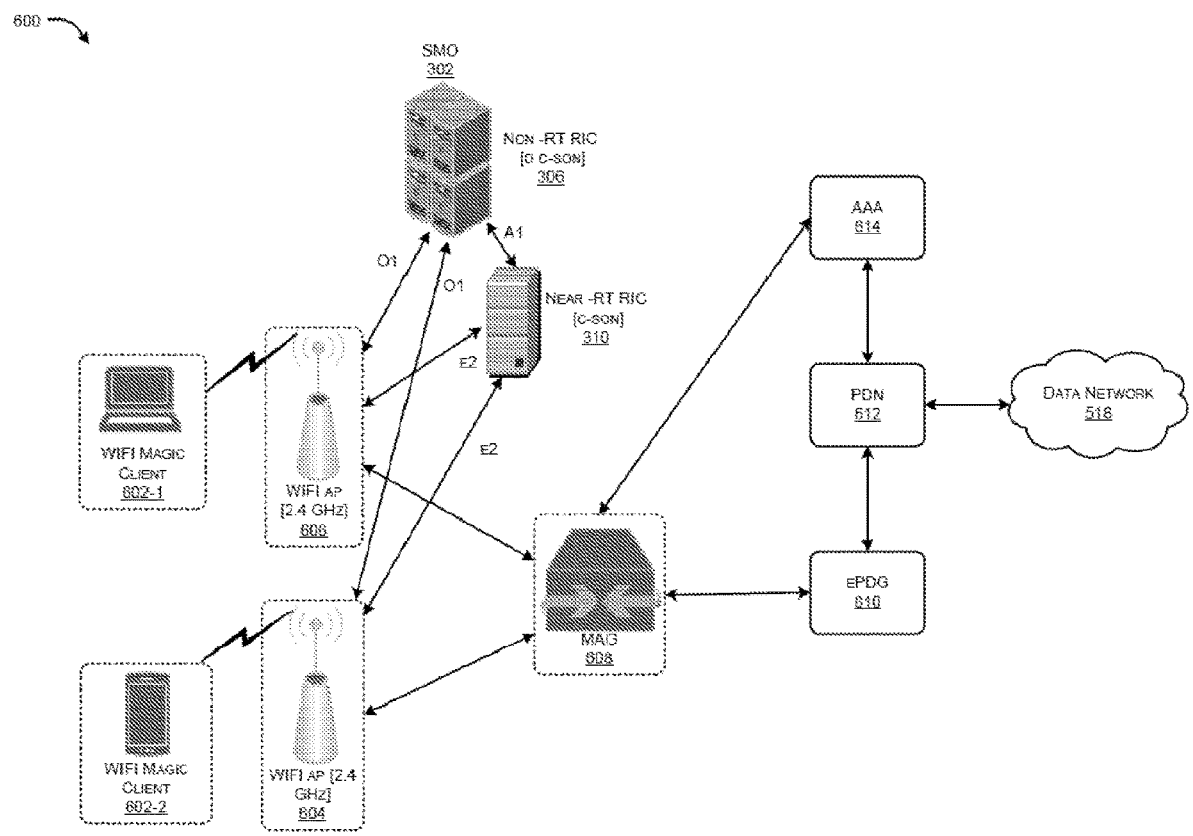
FIG. 6 illustrates an embodiment of the logical Wi-Fi architecture integrated with O-RAN framework in accordance with an embodiment of the present disclosure.

FIG. 6 illustrates an embodiment of the logical Wi-Fi architecture (600) integrated with O-RAN framework in accordance with an embodiment of the present disclosure. The EMS management entity at the SMO (302) can provide FCAPS support to the Wi-Fi APs (604, 606) via the logical O1 interface. The Time sensitive SON functionalities for Wi-Fi APs (604, 606) can be supported by executing the SON algorithms at the Near-RT RIC (310) and can coordinate with AP via the logical E2 interface. Similarly, the Time insensitive SON functionalities for Wi-Fi Aps (604, 606) can be supported by executing the SON algorithms at the Non-RT RIC (306) and can coordinate with AP via the logical A1 and E2 interface. The SON functionalities at RIC can collect the measurement data from the APs and the clients via the E2 Interface or can also collect the relevant data from the management entities via O1 interfaces.

Thus, the present disclosure provides a unique and efficient solution for integration of SON and RRM for the AP to find the best or nearly optimal temporal, spatial and spectral coordination configuration amongst all the APs. The SON/RRM shall need to configure optimal transmit power, used channel, operating channel bandwidth and sleep mode for each of the APs properly. The Wi-Fi SON/RRM may fulfil the following functionalities:

Static and Dynamic radio resource management.
  Optimally select channel and transmit power in order to reduce Wi-Fi and non Wi-Fi interference.
  Traffic Steering [TS] support.
  Intra-Wi-Fi TS: To balance Wi-Fi traffic across multiple Wi-Fi radio(s) providing coverage in a particular area.

Cellular network to Wi-Fi TS: To connect mobile users to best access network, be it Cellular or Wi-Fi.

Coverage hole detection/management.

To detect/report and automatically mitigate Wi-Fi coverage holes.

Energy Saving functionality.

To turn off certain Wi-Fi APs in periods of low traffic to conserve energy.

QoS and QoE Optimization.

Wi-Fi AP Outage management. [AP outage detection, recovery, compensation, compensation recovery.].

Wi-Fi AP Plug-and-Play [PnP] and the like

To avoid issues that arises due to Multi-vendor HetNet of Wi-Fi APs, the proposed SON/RRM with open interface towards the Aps provides an improved O-RAN framework that can fulfil all the requirements required in a high traffic network.

Figure 7:
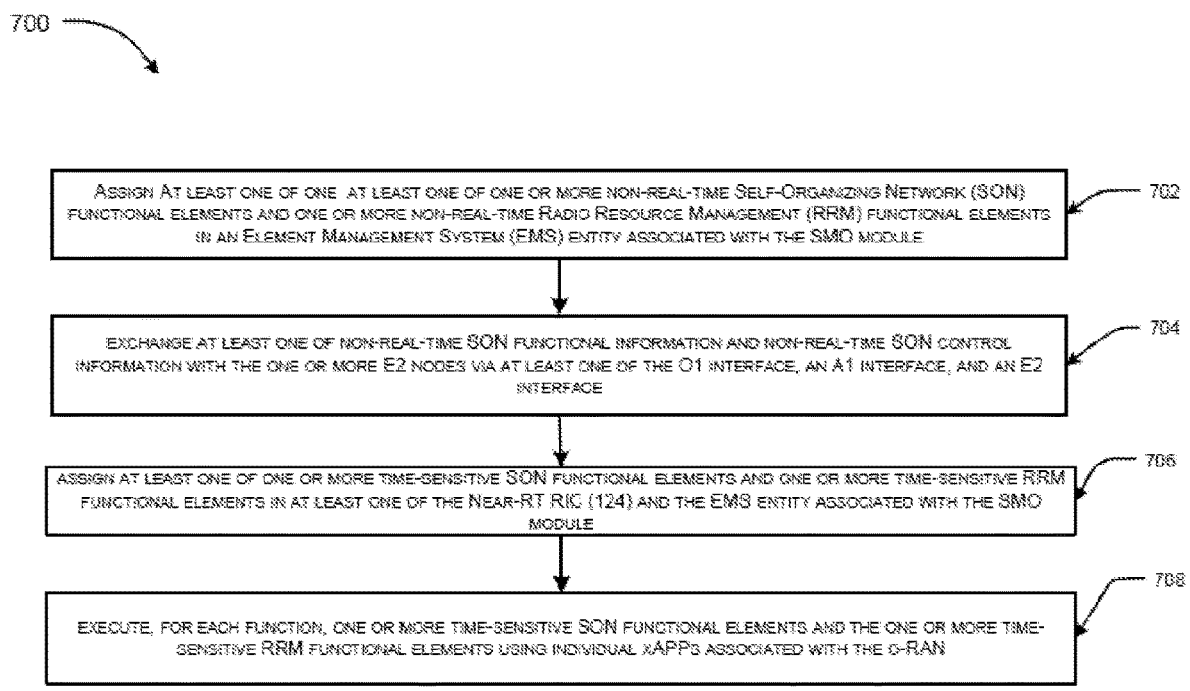
FIG. 7 illustrates a flow chart for a method for enabling self-organizing networks in an Open Radio Access Network (O-RAN), in accordance with embodiments of the present disclosure.

FIG. 7 illustrates a flow chart for a method (700) for enabling self-organizing networks in an Open Radio Access Network (O-RAN), in accordance with embodiments of the present disclosure.

At block (702), the method (700) includes assigning, via a Non-Real-Time Radio access network Intelligent Controller (Non-RT RIC) (122) associated with a system (100), at least one of one or more non-real-time Self-Organizing Network (SON) functional elements and one or more non-real-time Radio Resource Management (RRM) functional elements in an Element Management System (100) (EMS) entity associated with a SMO module (110). The Non-RT RIC (122) may be associated with a Service Management and Orchestration (SMO) module (110). The EMS entity communicates with one or more E2 nodes associated with a Radio Access Network (RAN), via an O1 interface. Further, the one or more non-real-time SON functional elements are implemented in at least one of, the Non-RT RIC (122) using individual rAPPs associated with the o-RAN, for each functional element, and the EMS entity or a Network Management System (100) (NMS) entity associated with the SMO module (110).

At block (704), the method (700) includes exchanging, by the Non-RT RIC (122) associated with the system (100), at least one of non-real-time SON functional information and non-real-time SON control information with the one or more E2 nodes via at least one of the O1 interface, an A1 interface, and an E2 interface.

At block (706), the method (700) includes assigning, by a Near Real Time Radio access network Intelligent Controller (Near-RT RIC) (124) associated with the system (100), at least one of one or more time-sensitive SON functional elements and one or more time-sensitive RRM functional elements in at least one of the Near-RT RIC (124) and the EMS entity associated with the SMO module (110).

At block (708), the method (700) includes executing, by the Near-RT RIC (124) associated with the system (100), for each function, one or more time-sensitive SON functional elements and the one or more time-sensitive RRM functional elements using individual xAPPs associated with the o-RAN. For each function, the one or more time-sensitive SON functional elements are implemented in the Near-RT RIC (124) using individual xAPPs associated with the o-RAN.

Figure 8:
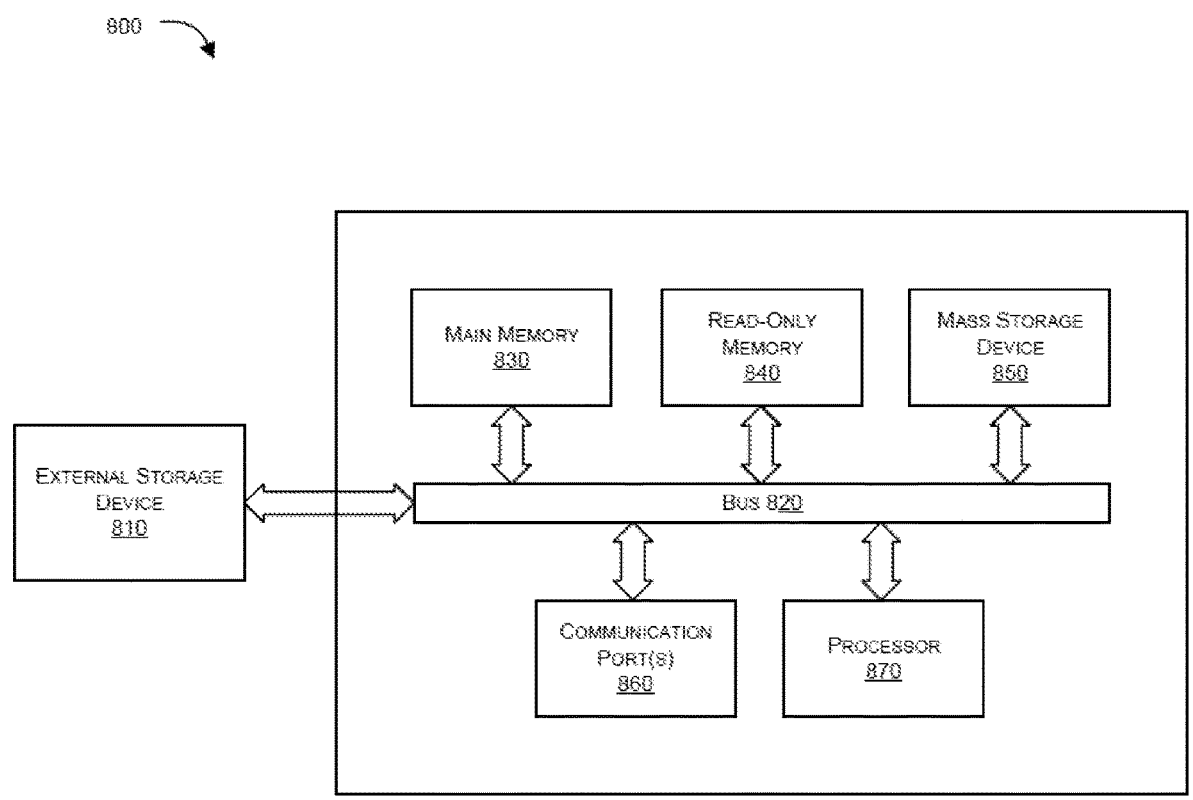
FIG. 8 illustrates an exemplary computer system in which or with which embodiments of the present invention can be utilized, in accordance with embodiments of the present disclosure.

FIG. 8 illustrates an exemplary computer system in which or with which embodiments of the present invention can be utilized in accordance with embodiments of the present disclosure. As shown in FIG. 8, computer system (800) can include an external storage device (810), a bus (820), a main memory (830), a read only memory 840, a mass storage device (850), communication port (860), and a processor (870). A person skilled in the art will appreciate that the computer system may include more than one processor and communication ports. Examples of processor (870) include, but are not limited to, an Intel® Itanium® or Itanium 2 processor(s), or AMD® Opteron® or Athlon MP® processor(s), Motorola® lines of processors, FortiSOC™ system on chip processors or other future processors. Processor (870) may include various modules associated with embodiments of the present invention. Communication port (860) can be any of an RS-232 port for use with a modem based dialup connection, a 10/100 Ethernet port, a Gigabit or 10 Gigabit port using copper or fiber, a serial port, a parallel port, or other existing or future ports. Communication port (860) may be chosen depending on a network, such a Local Area Network (LAN), Wide Area Network (WAN), or any network to which computer system connects. Memory (830) can be Random Access Memory (RAM), or any other dynamic storage device commonly known in the art. Read-only memory (840) can be any static storage device(s) e.g., but not limited to, a Programmable Read Only Memory (PROM) chips for storing static information e.g., start-up or BIOS instructions for processor 870. Mass storage (850) may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 882 family) or Hitachi (e.g., the Hitachi Deskstar 13K800), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus (820) communicatively couples processor(s) (870) with the other memory, storage and communication blocks. Bus (820) can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor (870) to software system.

Optionally, operator and administrative interfaces, e.g. a display, keyboard, and a cursor control device, may also be coupled to bus (820) to support direct operator interaction with a computer system. Other operator and administrative interfaces can be provided through network connections connected through communication port (860). The external storage device (810) can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While considerable emphasis has been placed herein on the preferred embodiments, it may be appreciated that many embodiments can be made and that many changes can be made in the preferred embodiments without departing from the principles of the invention. These and other changes in the preferred embodiments of the invention may be apparent to those skilled in the art from the disclosure herein, whereby it may to be distinctly understood that the foregoing descriptive matter to be implemented merely as illustrative of the invention and not as limitation.

RESERVATION OF RIGHTS

A portion of the disclosure of this patent document contains material which is subject to intellectual property rights such as, but are not limited to, copyright, design, trademark, IC layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner. The patent document includes systems and methods as defined in 3GPP Technical Specification (TS) 21. 900, TS 28. 300, and the like.

We claim:

1. A system (100) for enabling a Self-Organizing Network (SON) in an open Radio Access Network (o-RAN), the system (100) comprising:
a Service Management and Orchestration (SMO) module (110) comprising a Non-Real-Time Radio access network Intelligent Controller (Non-RT RIC) (122), wherein the Non-RT RIC (122) may configured to:
assign at least one of one or more non-real-time Self-Organizing Network (SON) functional elements and one or more non-real-time Radio Resource Management (RRM) functional elements in an Element Management System (EMS) entity associated with the SMO module (110),
wherein the EMS entity communicates with one or more E2 nodes associated with a Radio Access Network (RAN), via an O1 interface,
wherein the one or more non-real-time SON functional elements are implemented in at least one of, the Non-RT RIC (122) using individual rAPPs associated with the o-RAN, for each functional element, and the EMS entity or a Network Management System (NMS) entity associated with the SMO module (110);
exchange at least one of non-real-time SON functional information and non-real-time SON control information with the one or more E2 nodes via at least one of the O1 interface, an A1 interface, and an E2 interface; and
a Near Real Time Radio access network Intelligent Controller (Near-RT RIC) (124) may configured to:
assign at least one of one or more time-sensitive SON functional elements and one or more time-sensitive RRM functional elements in at least one of the Near-RT RIC (124) and the EMS entity associated with the SMO module (110); and
execute, for each function, one or more time-sensitive SON functional elements and the one or more time-sensitive RRM functional elements using individual xAPPs associated with the o-RAN,
wherein, for each function, the one or more time-sensitive SON functional elements are implemented in the Near-RT RIC (124) using individual xAPPs associated with the o-RAN.

2. The system (100) as claimed in claim 1, wherein at least one of the xAPPs and the rAPPs may further configured to:
register with the one or more E2 nodes for data ahead in time;
query, via the at least one of the Non-RT RIC (122) and the Near-RT RIC (124), for resident information of the one or more E2 nodes, upon registration; and
modify, an appropriate data collection technique, to request the one or more E2 nodes for at least one of a PUSH mechanism and a PULL mechanism with appropriate timer mechanism adjustments, based on the one or more E2 node response.

3. The system (100) as claimed in claim 1, wherein the Near-RT RIC (124) may further configured to:
access via at least one of the xAPPs associated with the O-RAN and EMN entity or the NMS entity, one or more Performance Monitoring (PM) counters, by requesting respective E2 Nodes via the E2 interface or via the O1 interface, respectively.

4. The system (100) as claimed in claim 1, wherein the non-real-time SON functional elements comprise at least one of an initial Physical layer Cell Identity (PCI) function, an initial Automatic Neighbor Relation (ANR) function, an Energy Saving (ES) function, a cell outage management function, a sick cell and sleeping cell management function, a traffic steering function, and a Timing advance (TA) optimization function.

5. The system (100) as claimed in claim 1, wherein the one or more E2 nodes execute, via one or more E2 agents, the non-real-time Self-Organizing Network (SON) functional elements and one or more non-real-time Radio Resource Management (RRM) functional elements from the Non-RT RIC (122) received at an E2 termination point by interacting with one or more E2 application functional elements of the one or more E2 nodes.

6. The system (100) as claimed in claim 1, wherein the one or more time-sensitive SON functional elements comprise at least one of a Mobility Load Balancing (MLB) function, a Mobility Robustness Optimization (MRO) function, a Random-Access Channel (RACH) optimization function, an Energy saving (ES) function, a radio link failure reporting function, a Coverage and Capacity Optimization (CCO) function, a Downlink (DL) power control function, a Remote Electrical Tilt (RET) function, a Forward Handover (FHO) function, a Frequent Handover Mitigation (FHM) function, an Interference Mitigation (Inter-Cell, Intra-Cell, Intra-RAT, Inter-RAT) function, an Inter-Cell Interference Control (ICIC) function, an initial Automatic Neighbor Relation (ANR) function, and a Physical layer Cell Identity (PCI) function.

7. The system (100) as claimed in claim 1, wherein the one or more time-sensitive RRM functional elements comprise at least one of a Call/Connection Admission Control (CAC) function, a Radio Bearer Control (RBC) function, a Connection Mobility Control (CMC) function, a Measurement Control (MC) function, an Inter-Cell Interference Control (ICIC) function, a Co-ordinated Multi-Point (CoMP) function, and a Dynamic Resource Allocation (DRA) function.

8. The system (100) as claimed in claim 1, wherein executing the one or more time-sensitive RRM functional elements in the Near-RT RIC (124) corresponds to localizing in a centralized execution site.

9. The system (100) as claimed in claim 1, wherein executing the one or more time-sensitive RRM functional elements comprise a global view of associated neighbor module (110)s and one or more respective decisions corresponding to the one or more time-sensitive RRM functional elements.

10. The system (100) as claimed in claim 1, wherein the EMS entity provides a complete Fault, Configuration, Accounting, Performance and Security (FCAPS) functions to each type of the one or more E2 nodes via the O1 interface.

11. The system (100) as claimed in claim 1, wherein the at least one of the EMS entity and the NMS entity implements a Domain-Centralized SON (DC-SON) functional element and a Cross Domain-Centralized SON (CD C-SON) functional element associated with the SMO module (110), respectively.

12. The system (100) as claimed in claim 11, wherein the DC-SON functional element and the CD C-SON functional element comprise at least one of a Traffic Area (TA) optimization function, and an end-to-end Quality of Experience (QoE) optimization function.

13. The system (100) as claimed in claim 1, wherein the one or more non-real-time SON functional elements, the one or more time-sensitive SON functional elements, and the one or more non-real-time RRM functional elements, the one or more time-sensitive RRM functional elements, at the Non RT-RIC and the Near-RT RIC (124) of the O-RAN architecture may implemented for a functional execution split localization of respective functions.

14. The system (100) as claimed in claim 1, wherein the EMS entity for the one or more E2 nodes of the DC-SON may assigned for one network vendor, and the one or more E2 nodes of the Radio Access Network (RAN) may assigned for different network vendors.

15. A method for enabling a Self-Organizing Network (SON) in an open Radio Access Network (o-RAN), the method comprising:
assigning, via a Non-Real-Time Radio access network Intelligent Controller (Non-RT RIC (122)) associated with a system (100), at least one of one or more non-real-time Self-Organizing Network (SON) functional elements and one or more non-real-time Radio Resource Management (RRM) functional elements in an Element Management System (100) (EMS) entity associated with a SMO module (110),
wherein the Non-RT RIC (122) may associated with a Service Management and Orchestration (SMO) module (110),
wherein the EMS entity communicates with one or more E2 nodes associated with a Radio Access Network (RAN), via an O1 interface,
wherein the one or more non-real-time SON functional elements are implemented in at least one of, the Non-RT RIC (122) using individual rAPPs associated with the o-RAN, for each functional element, and the EMS entity or a Network Management System (100) (NMS) entity associated with the SMO module (110);
exchanging, by the Non-RT RIC (122) associated with the system (100), at least one of non-real-time SON functional information and non-real-time SON control information with the one or more E2 nodes via at least one of the O1 interface, an A1 interface, and an E2 interface;
assigning, by a Near Real Time Radio access network Intelligent Controller (Near-RT RIC (124)) associated with the system (100), at least one of one or more time-sensitive SON functional elements and one or more time-sensitive RRM functional elements in at least one of the Near-RT RIC (124) and the EMS entity associated with the SMO module (110); and
executing, by the Near-RT RIC (124) associated with the system (100), for each function, one or more time-sensitive SON functional elements and the one or more time-sensitive RRM functional elements using individual xAPPs associated with the o-RAN,
wherein, for each function, the one or more time-sensitive SON functional elements are implemented in the Near-RT RIC (124) using individual xAPPs associated with the o-RAN.

16. The method as claimed in claim 15 further comprises:
registering, at least one of the xAPPs and the rAPPs associated with the system (100), with the one or more E2 nodes for data ahead in time;
querying, via the at least one of the Non-RT RIC (122) and the Near-RT RIC (124), for resident information of the one or more E2 nodes, upon registration; and
modifying, via the at least one of the Non-RT RIC (122) and the Near-RT RIC (124), an appropriate data collection technique, to request the one or more E2 nodes for at least one of a PUSH mechanism and a PULL mechanism with appropriate timer mechanism adjustments, based on the one or more E2 node response.

17. The method as claimed in claim 15 further comprises:
accessing, by the Near-RT RIC (124), via at least one of the xAPPs associated with the O-RAN and EMN entity or the NMS entity, one or more Performance Monitoring (PM) counters, by requesting respective E2 Nodes via the E2 interface or via the O1 interface, respectively.

18. The method as claimed in claim 15, wherein the non-real-time SON functional elements comprise at least one of an initial Physical layer Cell Identity (PCI) function, an initial Automatic Neighbor Relation (ANR) function, an Energy Saving (ES) function, a cell outage management function, a sick cell and sleeping cell management function, a traffic steering function, and a Timing advance (TA) optimization function.

19. The method as claimed in claim 15, wherein the one or more E2 nodes execute, via one or more E2 agents, the non-real-time Self-Organizing Network (SON) functional elements and one or more non-real-time Radio Resource Management (RRM) functional elements from the Non-RT RIC (122) received at an E2 termination point by interacting with one or more E2 application functional elements of the one or more E2 nodes.

20. The method as claimed in claim 15, wherein the one or more time-sensitive SON functional elements comprise at least one of a Mobility Load Balancing (MLB) function, a Mobility Robustness Optimization (MRO) function, a Random-Access Channel (RACH) optimization function, an Energy saving (ES) function, a radio link failure reporting function, a Coverage and Capacity Optimization (CCO) function, a Downlink (DL) power control function, a Remote Electrical Tilt (RET) function, a Forward Handover (FHO) function, a Frequent Handover Mitigation (FHM) function, an Interference Mitigation (Inter-Cell, Intra-Cell, Intra-RAT, Inter-RAT) function, an Inter-Cell Interference Control (ICIC) function, an initial Automatic Neighbor Relation (ANR) function, and a Physical layer Cell Identity (PCI) function.

21. The method as claimed in claim 15, wherein the one or more time-sensitive RRM functional elements comprise at least one of a Call/Connection Admission Control (CAC) function, a Radio Bearer Control (RBC) function, a Connection Mobility Control (CMC) function, a Measurement Control (MC) function, an Inter-Cell Interference Control (ICIC) function, a Co-ordinated Multi-Point (CoMP) function, and a Dynamic Resource Allocation (DRA) function.

22. The method as claimed in claim 15, wherein executing the one or more time-sensitive RRM functional elements in the Near-RT RIC (124) corresponds to localizing in a centralized execution site.

23. The method as claimed in claim 15, wherein executing the one or more time-sensitive RRM functional elements comprise a global view of associated neighbor module (110)s and one or more respective decisions corresponding to the one or more time-sensitive RRM functional elements.

24. The method as claimed in claim 15, wherein the EMS entity provides a complete Fault, Configuration, Accounting, Performance and Security (FCAPS) functions to each type of the one or more E2 nodes via the O1 interface.

25. The method as claimed in claim 15, wherein the at least one of the EMS entity and the NMS entity implements a Domain-Centralized SON (DC-SON) functional element and a Cross Domain-Centralized SON (CD C-SON) functional element associated with the SMO module (110), respectively.

26. The method as claimed in claim 25, wherein the DC-SON functional element and the CD C-SON functional element comprise at least one of a Traffic Area (TA) optimization function, and an end-to-end Quality of Experience (QoE) optimization function.

27. The method as claimed in claim 15, wherein the one or more non-real-time SON functional elements, the one or more time-sensitive SON functional elements, and the one or more non-real-time RRM functional elements, the one or more time-sensitive RRM functional elements, at the Non RT-RIC and the Near-RT RIC (124) of the O-RAN architecture may implemented for a functional execution split localization of respective functions.

28. The method as claimed in claim 15, wherein the EMS entity for the one or more E2 nodes of the DC-SON may assigned for one network vendor, and the one or more E2 nodes of the Radio Access Network (RAN) may assigned for different network vendors.

* * * * *